(12) United States Patent
Shinohara et al.

(10) Patent No.: US 12,546,477 B2
(45) Date of Patent: Feb. 10, 2026

(54) HEATING COOKING APPARATUS

(71) Applicant: SHARP KABUSHIKI KAISHA, Sakai (JP)

(72) Inventors: Yu Shinohara, Sakai (JP); Masahiro Nishijima, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 877 days.

(21) Appl. No.: 17/793,644

(22) PCT Filed: Jan. 14, 2021

(86) PCT No.: PCT/JP2021/001062
§ 371 (c)(1),
(2) Date: Jul. 18, 2022

(87) PCT Pub. No.: WO2021/149585
PCT Pub. Date: Jul. 29, 2021

(65) Prior Publication Data
US 2023/0092833 A1  Mar. 23, 2023

(30) Foreign Application Priority Data

Jan. 21, 2020  (JP) ................. 2020-007571

(51) Int. Cl.
*F24C 7/02* (2006.01)
*F24C 7/08* (2006.01)
(Continued)

(52) U.S. Cl.
CPC .................. *F24C 7/02* (2013.01); *F24C 7/08* (2013.01); *F24C 15/02* (2013.01); *F24C 15/162* (2013.01); *H05B 6/6414* (2013.01)

(58) Field of Classification Search
None
See application file for complete search history.

(56) References Cited

U.S. PATENT DOCUMENTS 4,335,292 A  6/1982  Tanaka et al.
8,253,084 B2  8/2012  Toyoda et al.
(Continued)

FOREIGN PATENT DOCUMENTS

JP  H07-113526 A  5/1995
JP  2010-133634 A  6/2010
(Continued)

OTHER PUBLICATIONS

Translation of KR-100936768-B1 (Year: 2010).*

*Primary Examiner* — Elizabeth M Kerr
(74) *Attorney, Agent, or Firm* — ScienBiziP, P.C.

(57) ABSTRACT

A heating cooking apparatus (1) includes a heating cooking chamber (10), a housing (14), a microwave supply unit (53), and a pull-out body unit (13). The heating cooking chamber (10) includes an accommodation space (1A), an opening (11A), and a first surface (11D). The opening (11A) communicates with the accommodation space (1A). The first surface (11D) is disposed on an outer circumference of the opening (11A). The housing (14) accommodates the heating cooking chamber (10). The microwave supply unit (53) supplies microwaves to an interior of the heating cooking chamber (10). The pull-out body unit (13) includes a pull-out body (130) and an angle adjustment member (40). The pull-out body (130) includes a second surface (131A) facing the first surface (11D). The angle adjustment member (40) can be used to adjust an angle of the second surface (131A) relative to the first surface (11D). The housing (14) includes a through hole (14A1). The through hole (14A1) faces the angle adjustment member (30).

8 Claims, 20 Drawing Sheets

(51) Int. Cl.
    *F24C 15/02*     (2006.01)
    *F24C 15/16*     (2006.01)
    *H05B 6/64*     (2006.01)

(56) References Cited

U.S. PATENT DOCUMENTS

| | | | |
|---|---|---|---|
| 2010/0133263 A1 | 6/2010 | Toyoda et al. | |
| 2012/0187115 A1 | 7/2012 | Toyoda et al. | |
| 2012/0192725 A1 | 8/2012 | Toyoda et al. | |
| 2015/0354828 A1* | 12/2015 | Adelmann | F24C 15/162 126/19 R |
| 2017/0171921 A1 | 6/2017 | Nasu et al. | |
| 2018/0073743 A1* | 3/2018 | Adelmann | F24C 11/00 |

FOREIGN PATENT DOCUMENTS

| | | | |
|---|---|---|---|
| JP | 2017-099956 A | 6/2017 | |
| JP | 2019-107327 A | 7/2019 | |
| KR | 100936768 B1 * | 1/2010 | F24C 15/162 |

* cited by examiner

HEATING COOKING APPARATUS

TECHNICAL FIELD

The present invention relates to a heating cooking apparatus.

BACKGROUND ART

A heating cooking apparatus including a heating cooking chamber, a pull-out body, and a housing is known. The heating cooking chamber includes an accommodation space. The pull-out body includes an opening/closing door. The pull-out body is disposed to be able to be pulled out relative to the accommodation space. The housing accommodates the heating cooking chamber. Such a heating cooking apparatus as described above is built into a cabinet of a built-in kitchen.

PTL 1 discloses a heating cooking apparatus. Heating functions of the heating cooking apparatus disclosed in PTL 1 include a microwave heating function. The microwave heating function is a function of irradiating an object to be heated with microwaves.

In order to prevent leakage of electric waves from a heating cooking chamber, an accommodation space is sealed by an opening/closing door. Unfortunately, the accommodation space may not be sealed by the opening/closing door due to variations in the dimensions of parts. In this case, the arrangement of the opening/closing door is adjusted to prevent leakage of electric waves. In the heating cooking apparatus disclosed in PTL 1, the arrangement of a pull-out body is adjusted in a state where a housing is removed and the pull-out body is pulled out.

CITATION LIST

Patent Literature

PTL 1: JP 2010-133634 A

SUMMARY OF INVENTION

Technical Problem

Unfortunately, in the heating cooking apparatus disclosed in PTL 1, because the arrangement of the pull-out body is adjusted in a state where the housing is removed and the pull-out body is pulled out, it takes time and effort to adjust the arrangement of the pull-out body.

In light of the problems described above, an object of the present invention is to provide a heating cooking apparatus in which an arrangement of a pull-out body for preventing leakage of electric waves can be adjusted simply.

Solution to Problem

A heating cooking apparatus of the present invention includes a heating cooking chamber, a housing, a microwave supply unit, and a pull-out body unit. The heating cooking chamber includes an accommodation space, an opening, and a first surface. The accommodation space accommodates an object to be heated. The opening communicates with the accommodation space. The first surface is disposed on an outer circumference of the opening. The housing accommodates the heating cooking chamber. The microwave supply unit supplies microwaves to an interior of the heating cooking chamber. The pull-out body unit includes a pull-out body and an angle adjustment member. The pull-out body includes a second surface. The second surface faces the first surface. The pull-out body can be freely pulled out relative to the heating cooking chamber. The angle adjustment member can be used to adjust an angle of the second surface relative to the first surface. The housing includes a through hole. The through hole faces the angle adjustment member.

Advantageous Effects of Invention

According to a heating cooking apparatus of the present invention, it is possible to simply adjust the arrangement of a pull-out body for preventing leakage of electric waves.

DESCRIPTION OF EMBODIMENTS

Figure 1:
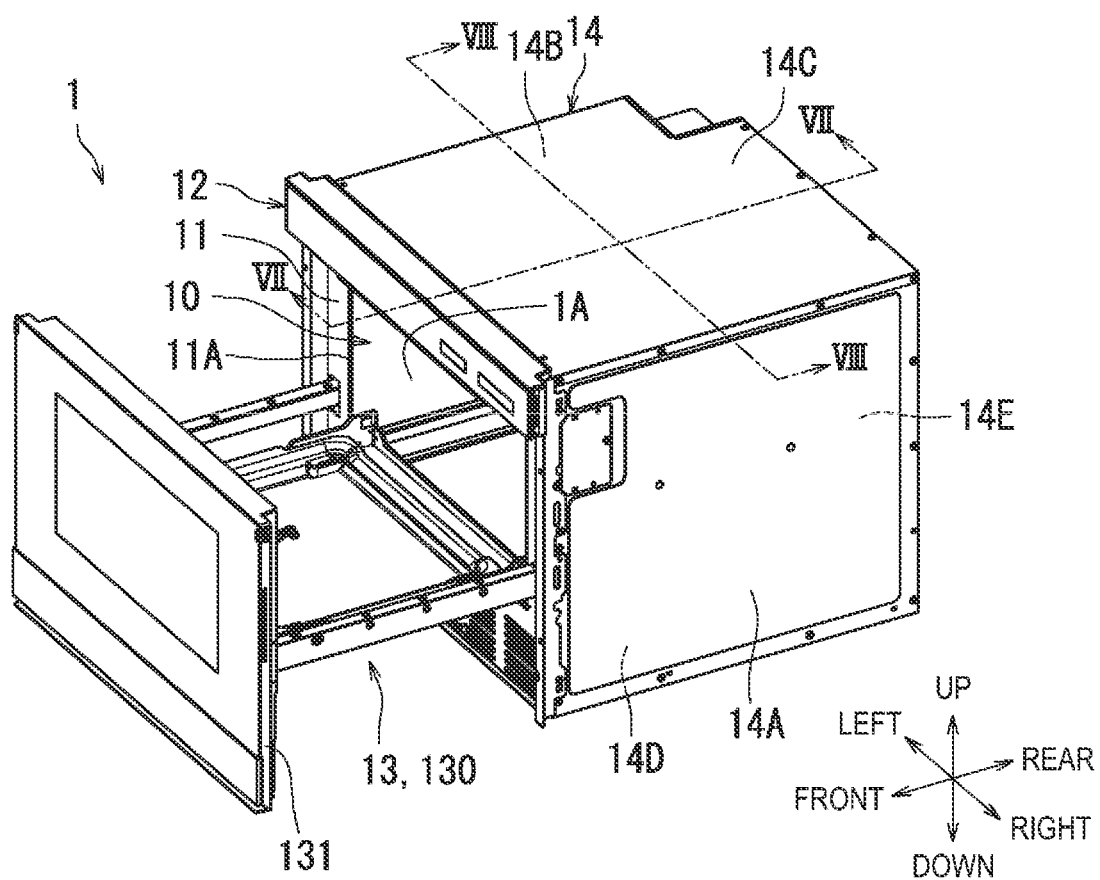
FIG. 1 is a perspective view of a heating cooking apparatus according to an embodiment of the present invention.

An embodiment of a heating cooking apparatus according to the present invention will be described below with reference to the drawings. Note that, in the drawings, the same or equivalent components are denoted by the same reference numerals and signs, and description thereof will not be repeated.

Figure 2:
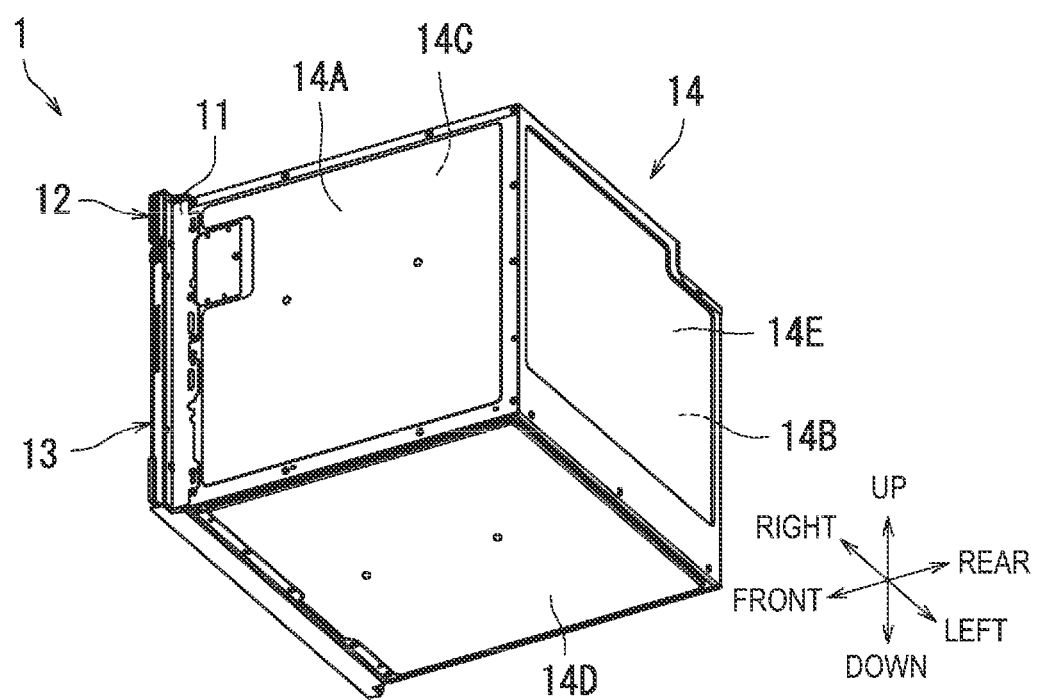
FIG. 2 is a perspective view of the heating cooking apparatus according to the embodiment of the present invention.

With reference to FIG. 1 and FIG. 2, a heating cooking apparatus 1 according to the present embodiment will be described. FIG. 1 and FIG. 2 are perspective views of the heating cooking apparatus 1 according to the present embodiment. Specifically. FIG. 1 illustrates the heating cooking apparatus 1 in an upper right diagonal direction from the front. FIG. 2 illustrates the heating cooking apparatus 1 in a lower right diagonal direction from behind.

The heating cooking apparatus 1 is used to heat and cook an object to be heated. The object to be heated is, for example, food. As illustrated in FIG. 1, the heating cooking apparatus 1 includes a heating cooking chamber 10, an operation panel unit 12, a pull-out body unit 13, and a housing 14.

In the present embodiment, a side on which the operation panel unit 12 of the heating cooking apparatus 1 is disposed is defined as a front side, and a side opposite thereto is defined as a rear side. Further, a right side as viewed from the front side of the heating cooking apparatus 1 is defined as a right side, and a side opposite thereto is defined as a left side. Further, a side on which the operation panel unit 12 is disposed in a direction orthogonal to a front-rear direction and a left-right direction of the heating cooking apparatus 1 is defined as an upper side, and a side opposite thereto is defined as a lower side. Note that these directions are not intended to limit the directions of the heating cooking apparatus according to the present invention when the heating cooking apparatus is used.

The heating cooking chamber 10 is a box-like member. The heating cooking chamber 10 internally includes an accommodation space 1A. The accommodation space 1A accommodates an object to be heated.

In the present embodiment, the heating cooking apparatus 1 includes, as heating cooking modes, a microwave heating mode, a first hot air circulation heating mode, a second hot air circulation heating mode, and a grill heating mode. The microwave heating mode is mainly a mode in which an object to be heated is heated and cooked through radiation of microwaves into the accommodation space 1A. The first hot air circulation heating mode is mainly a mode in which an object to be heated is heated and cooked by circulating first hot air H1 in the accommodation space 1A to make the temperature in the accommodation space 1A uniform. The second hot air circulation heating mode mainly includes a first mode and a second mode. The first mode is a mode in which an object to be heated is heated and cooked by directly blowing second hot air H2 onto an upper surface of the object to be heated. The second mode is a mode in which the inside of the accommodation space 1A is preheated in a short time by circulating the second hot air H2 in the accommodation space 1A. The grill heating mode is mainly a mode in which an object to be heated is heated and cooked by exposing the object to be heated to heat radiation.

The heating cooking chamber 10 includes a panel 11. The panel 11 is disposed on the front side of the heating cooking chamber 10. The panel 11 includes a first opening 11A. The first opening 11A is located at a substantially center portion of the panel 11. The first opening 11A has a rectangular shape. The first opening 11A communicates with the accommodation space 1A. Details of the panel 11 will be described below with reference to FIG. 6.

The operation panel unit 12 receives operation from a user. The operation panel unit 12 is disposed further forward than the panel 11. In other words, the operation panel unit 12 is disposed in front of the heating cooking chamber 10. The operation panel unit 12 is located at an upper portion of the heating cooking apparatus 1.

The pull-out body unit 13 includes a pull-out body 130. The pull-out body 130 can be pulled out freely relative to the heating cooking chamber 10 in a pull-out direction. Specifically, the pull-out body 130 is pulled out in the front direction of the heating cooking chamber 10. The pull-out body unit 13 is located below the operation panel unit 12. Details of the configuration of the pull-out body unit 13 will be described below with reference to FIG. 3 and FIG. 4. The pull-out direction of the pull-out body 130 is substantially parallel to the front-rear direction.

The housing 14 accommodates the heating cooking chamber 10. The housing 14 is an object having a rectangular parallelepiped shape with an open front side. As illustrated in FIG. 2, the housing 14 includes a right wall 14A, a left wall 14B, an upper wall 14C, a lower wall 14D, and a rear wall 14E.

Figure 3:
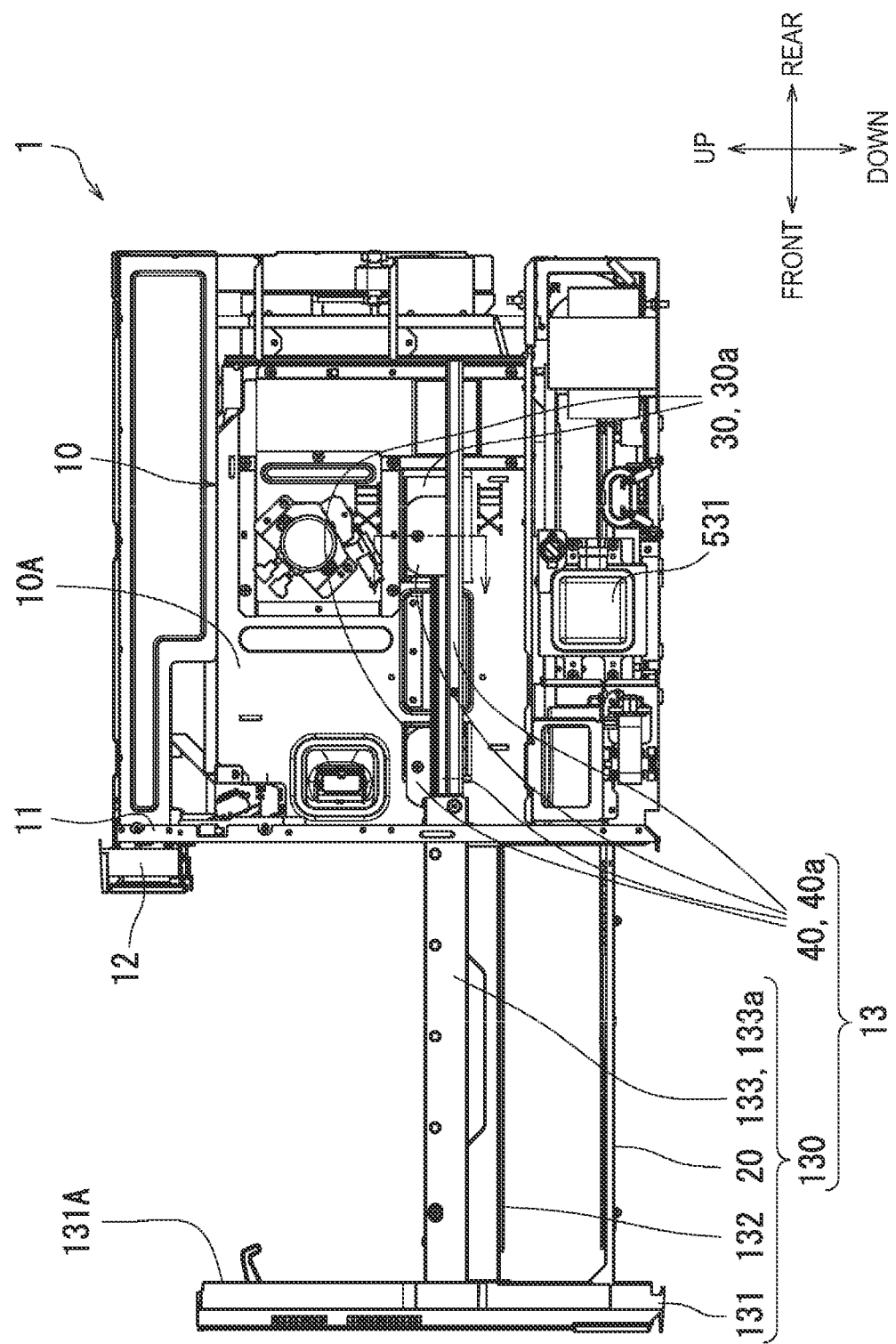
FIG. 3 is a diagram illustrating a right side surface of the heating cooking apparatus according to the embodiment of the present invention.
Figure 4:
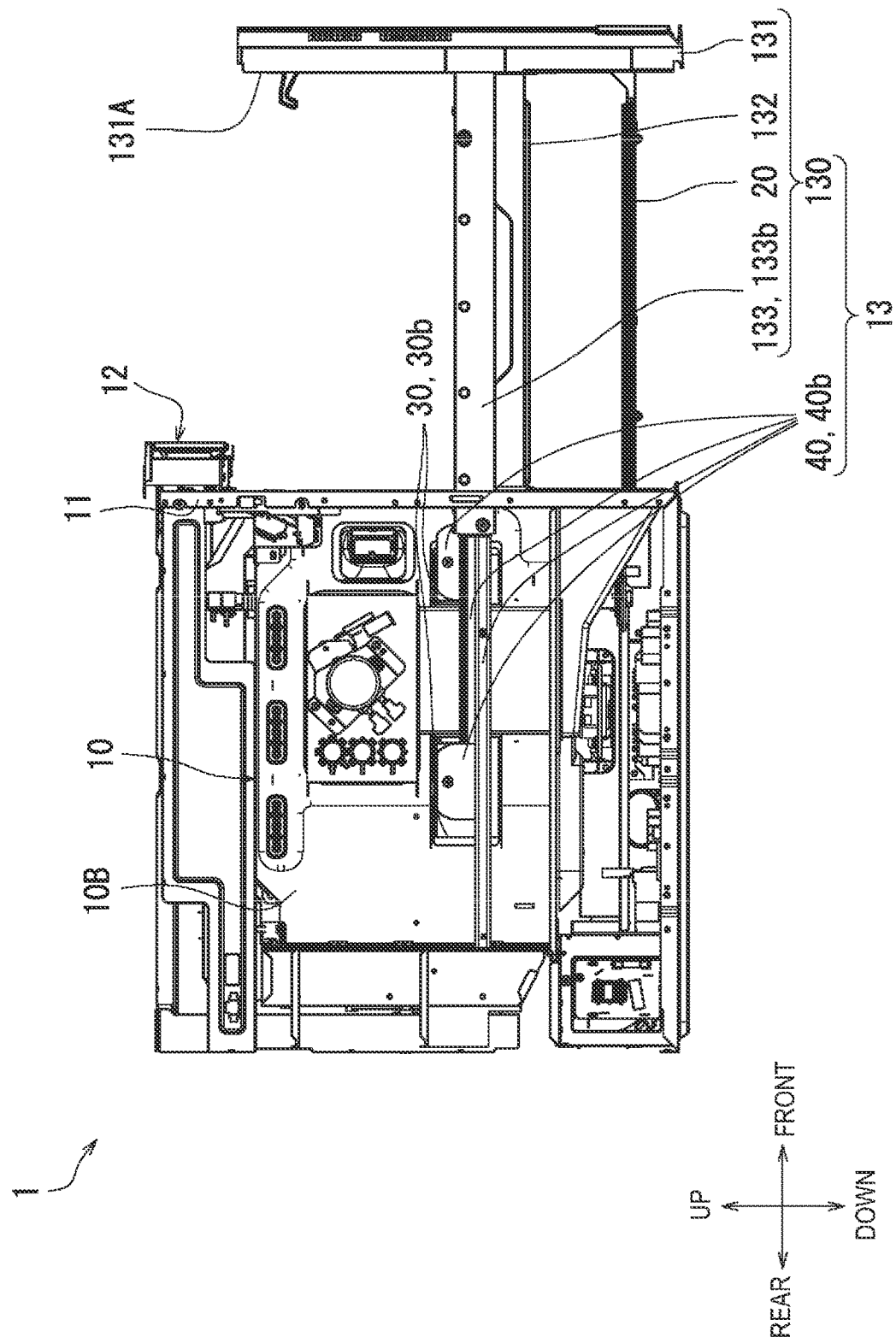
FIG. 4 is a diagram illustrating a left side surface of the heating cooking apparatus according to the embodiment of the present invention.
Figure 5:
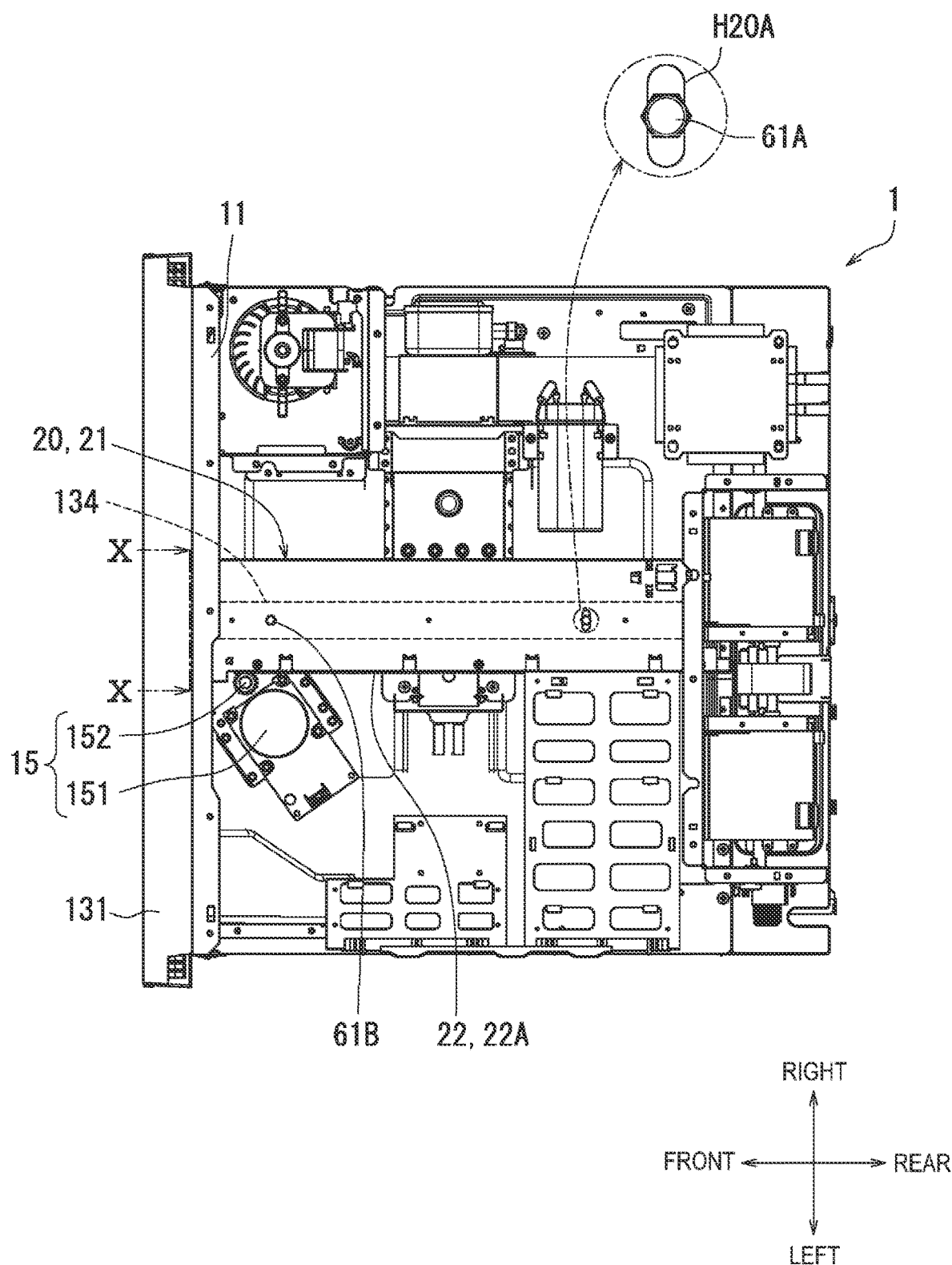
FIG. 5 is a diagram illustrating a bottom surface of the heating cooking apparatus according to the embodiment of the present invention.

Next, the pull-out body unit 13 will be further described with reference to FIG. 1 to FIG. 5. FIG. 3 is a diagram illustrating a right side surface of the heating cooking apparatus 1 according to the present embodiment. Specifically. FIG. 3 illustrates the right side surface of the heating cooking apparatus 1 in a state where the housing 14 is removed. FIG. 4 is a diagram illustrating a left side surface of the heating cooking apparatus 1 according to the present embodiment. Specifically. FIG. 4 illustrates the left side surface of the heating cooking apparatus 1 in a state where the housing 14 is removed. FIG. 5 is a diagram illustrating a bottom surface of the heating cooking apparatus 1 according to the present embodiment. Specifically. FIG. 5 illustrates the bottom surface of the heating cooking apparatus 1 in a state where the housing 14 is removed.

As illustrated in FIG. 3 and FIG. 4, the pull-out body 130 includes a lid portion 131, a placing portion 132, a pair of left and right slide members 133, and a support member 20. The support member 20 is an example of an angle adjustment member.

The lid portion 131 can open and close the first opening 11A (see FIG. 1) of the panel 11. As illustrated in FIG. 1, the lid portion 131 is a substantially rectangular plate-like member.

An object to be heated can be placed on the placing portion 132. As illustrated in FIG. 3 and FIG. 4, the lid portion 131 includes a rear surface 131A. The placing portion 132 is attached to the rear surface 131A of the lid portion 131. The rear surface 131A of the lid portion 131 is planar. The rear surface 131A of the lid portion 131 is an example of a second surface.

The pair of left and right slide members 133 support the lid portion 131. The pair of left and right slide members 133 support the placing portion 132 by supporting the lid portion 131. The pair of left and right slide members 133 are attached to the rear surface 131A of the lid portion 131. Each of the pair of left and right slide members 133 extends along the front-rear direction. Each of the pair of left and right slide members 133 is a tubular member. Each of the pair of left and right slide members 133 includes a hollow portion therein. The pair of left and right slide members 133 include a right slide member 133*a* (see FIG. 3) and a left slide member 133*b* (see FIG. 4).

The support member 20 supports the lid portion 131. The support member 20 supports the placing portion 132 by supporting the lid portion 131. The support member 20 is attached at a substantially center portion of the rear surface 131A of the lid portion 131 in the left-right direction, and below the placing portion 132. As illustrated in FIG. 5, the support member 20 is a plate-like member with the front-rear direction as a longitudinal direction. The support member 20 engages with a drive mechanism 15. The drive mechanism 15 will be described below with reference to FIG. 1 to FIG. 12.

Figure 6:
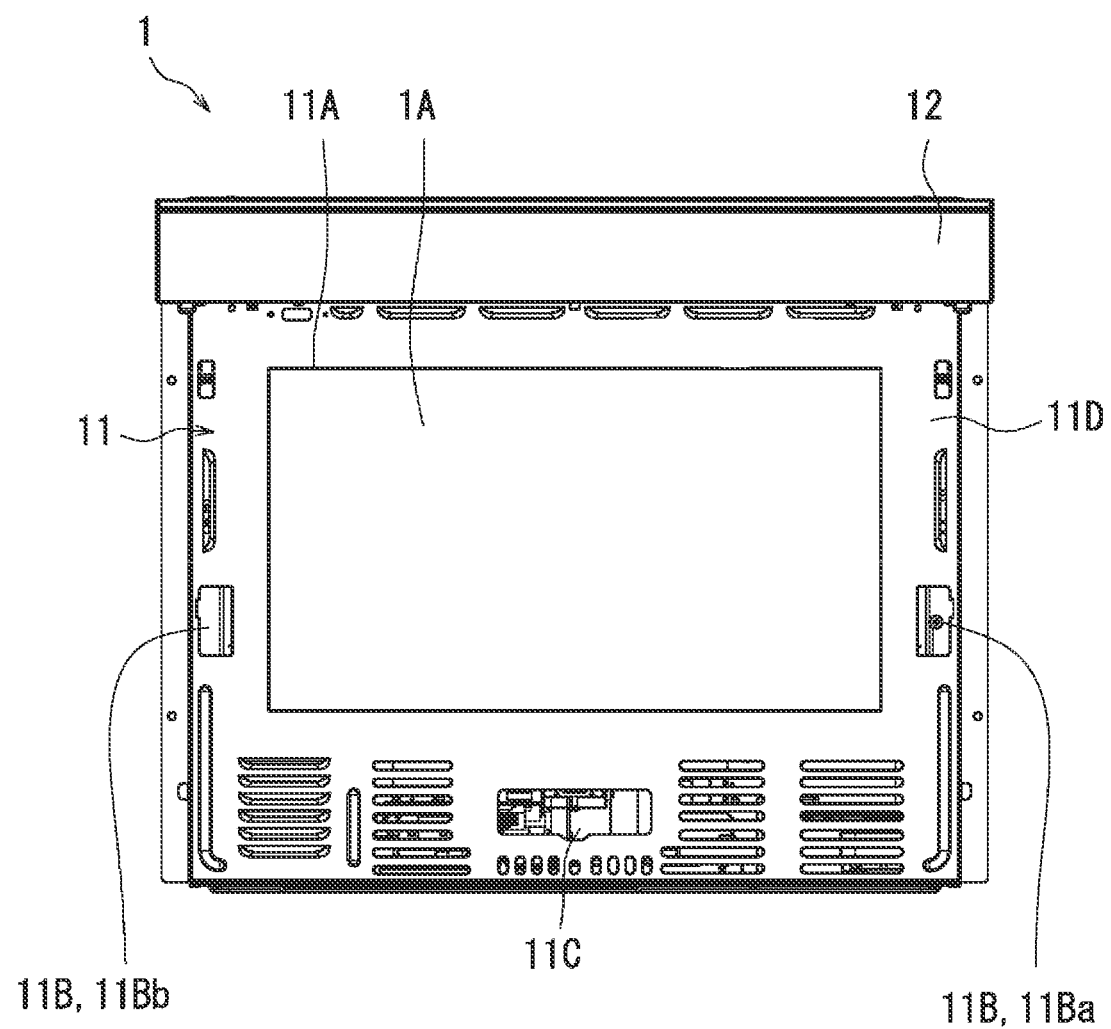
FIG. 6 is a front view of the heating cooking apparatus according to the embodiment of the present invention.

Next, the panel 11 will be further described with reference to FIG. 1 to FIG. 6. FIG. 6 is a front view of the heating cooking apparatus 1 according to the present embodiment. Specifically, FIG. 6 illustrates the heating cooking apparatus 1 in a state where the pull-out body 130 is removed.

As illustrated in FIG. 6, the panel 11 is a rectangular plate-like member. The panel 11 includes a pair of second openings 11B, a third opening 11C, and a front surface 11D in addition to the first opening 11A. The front surface 11D has a planar shape. The front surface 11D is an example of a first surface.

The pair of second openings 11B include a right opening 11Ba and a left opening 11Bb. The right opening 11Ba is located on the panel 11 at a portion to the right of the first opening 11A of the panel 11. The left opening 11Bb is located on the panel 11 at a portion to the left of the first opening 11A of the panel 11. The right slide member 133*a* described with reference to FIG. 3 and FIG. 4 passes through the right opening 11Ba of the panel 11. The left slide member 133*b* described with reference to FIG. 3 and FIG. 4 passes through the left opening 11Bb of the panel 11.

The third opening 11C is located on the panel 11 at a portion below the first opening 11A of the panel 11 and at a substantially center portion of the first opening 11A of the panel 11 in the left-right direction. The support member 20 described with reference to FIG. 3 and FIG. 4 passes through the third opening 11C of the panel 11.

Next, configurations of the heating cooking chamber 10 and the pull-out body unit 13 will be further described with reference to FIG. 1 to FIG. 6.

As illustrated in FIG. 3 and FIG. 4, the heating cooking chamber 10 includes a pair of left and right attachment portions 30. The pull-out body unit 13 further includes a pair of left and right slide rails 40. The pair of left and right attachment portions 30 are examples of attachment portions. The pair of left and right slide rails 40 are examples of angle adjustment members.

The pair of left and right slide rails 40 are pivotally attached to the pair of left and right attachment portions 30. The pair of left and right attachment portions 30 include a right attachment portion 30*a* (see FIG. 3) and a left attachment portion 30*b* (see FIG. 4). As illustrated in FIG. 3, the heating cooking chamber 10 includes a right wall 10A. The right attachment portion 30*a* is located at the right wall 10A of the heating cooking chamber 10. As illustrated in FIG. 4, the heating cooking chamber 10 includes a left wall 10B. The left attachment portion 30*b* is located at the left wall 10B of the heating cooking chamber 10. Details of the configuration of the right attachment portion 30*a* will be described below with reference to FIG. 13 to FIG. 15. The configuration of the left attachment portion 30*b* is substantially the same as the configuration of the right attachment portion 30*a*. Description of the configuration of the left attachment portion 30*b* is omitted.

The pair of left and right slide members 133 engage with the pair of left and right slide rails 40. The pair of left and right slide rails 40 slidably support the pull-out body 130 in the front-rear direction. As illustrated in FIG. 3 and FIG. 4, the pair of left and right slide rails 40 include a right slide rail 40*a* (see FIG. 3) and a left slide rail 40*b* (see FIG. 4).

The right slide rail 40*a* and the left slide rail 40*b* are attached to an outer surface of the heating cooking chamber 10. Specifically, as illustrated in FIG. 3, the right slide rail 40*a* is attached to the right attachment portion 30*a*. The right slide member 133*a* of the pull-out body 130 is slidably supported by the right slide rail 40*a*. As illustrated in FIG. 4, the left slide rail 40*b* is attached to the left attachment portion 30*b*. The left slide member 133*b* of the pull-out body 130 is slidably supported by the left slide rail 40*b*. Configurations of the right slide rail 40*a* and the left slide rail 40*b* are substantially the same. Details of the configurations of the pair of left and right slide rails 40 will be described below with reference to FIG. 13, FIG. 15, and FIG. 16.

Figure 7:
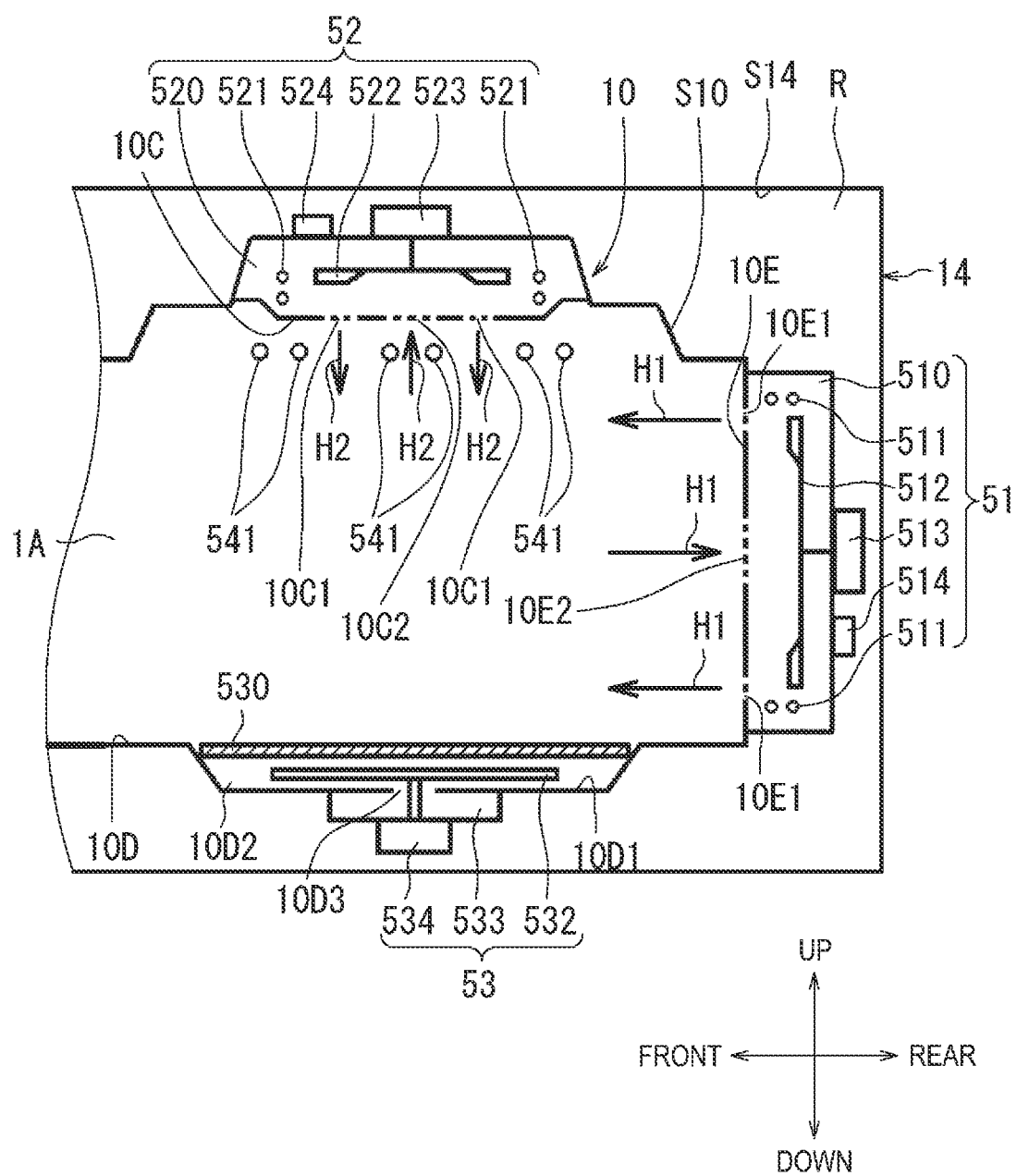
FIG. 7 is a cross-sectional view of the heating cooking apparatus along a section line VII in FIG. 1.
Figure 8:
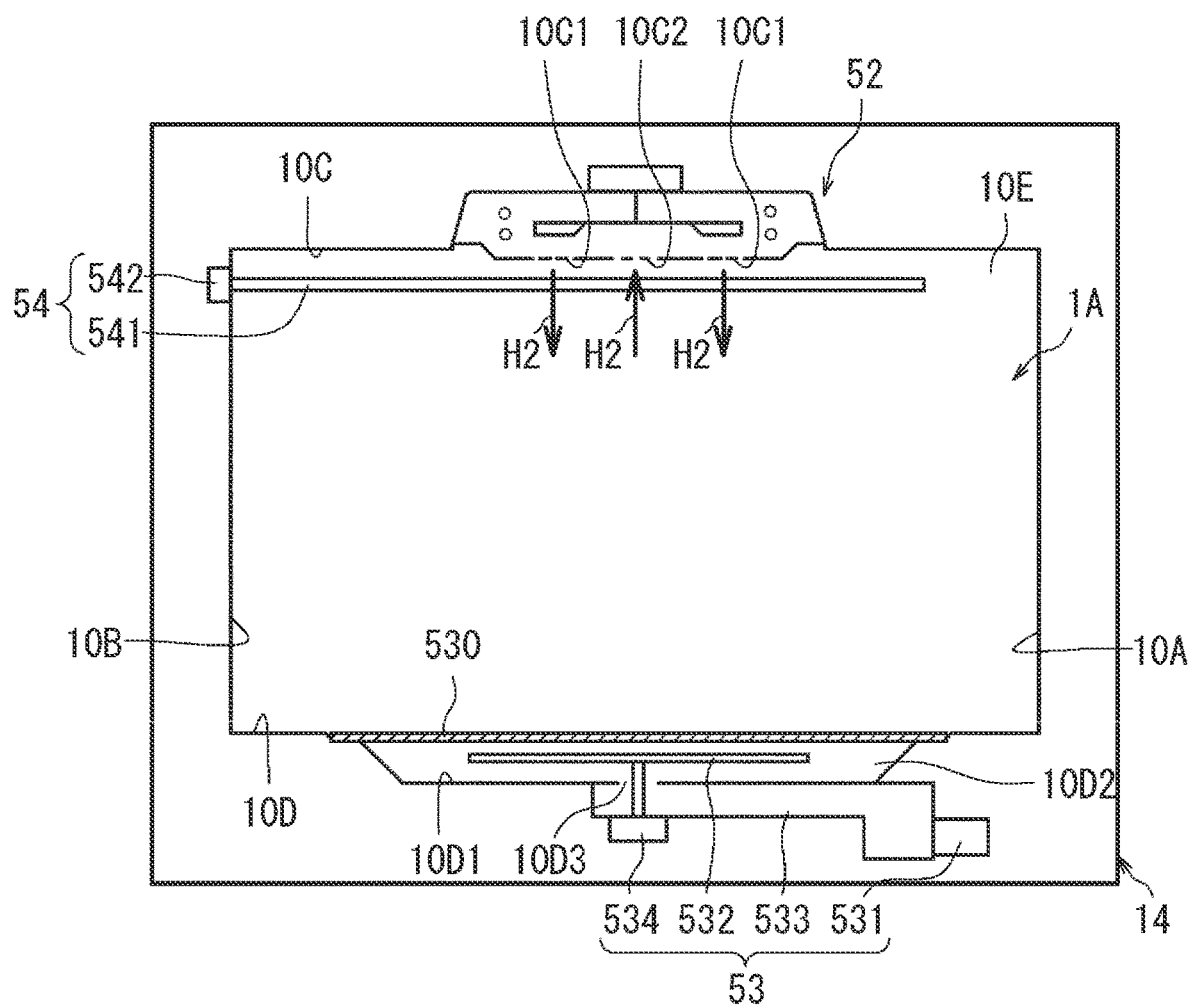
FIG. 8 is a cross-sectional view of the heating cooking apparatus along a section line VIII in FIG. 1.

Next, the configuration of the heating cooking apparatus 1 according to the present embodiment will be further described with reference to FIG. 1 to FIG. 8. FIG. 7 is a cross-sectional view of the heating cooking apparatus 1 along a section line VII in FIG. 1. FIG. 8 is a cross-sectional view of the heating cooking apparatus 1 along a section line VIII in FIG. 1.

As illustrated in FIG. 7, the heating cooking chamber 10 includes an upper wall 10C, a bottom wall 10D, and a rear wall 10E, in addition to the right wall 10A and the left wall 10B. The accommodation space 1A is formed by the right wall 10A, the left wall 10B, the upper wall 10C, the bottom wall 10D, and the rear wall 10E. The accommodation space 1A of the heating cooking chamber 10 has a substantially rectangular parallelepiped shape.

The heating cooking apparatus 1 further includes a first air sending unit 51, a second air sending unit 52, a microwave supply unit 53, and a grill unit 54 (see FIG. 8).

The first air sending unit 51 supplies the first hot air H1 into the accommodation space 1A. In other words, the first air sending unit 51 executes a first hot air circulation heating mode. The first air sending unit 51 is attached to the outer side of the rear wall 10E. The rear wall 10E includes a plurality of first blow-out hole portions 10E1 and a plurality of first intake hole portions 10E2. The plurality of first intake hole portions 10E2 are located at a substantially center portion of the rear wall 10E. The plurality of first blow-out hole portions 10E1 are located on the rear wall 10E at an outer portion of the plurality of first intake hole portions 10E2 in the rear wall 10E.

The first air sending unit 51 includes a first air sending chamber 510, a first heater 511, a first centrifugal fan 512, a first drive unit 513, and a first energization unit 514. The first heater 511 and the first centrifugal fan 512 are accommodated in the first air sending chamber 510. The first drive unit 513 and the first energization unit 514 are located on the outer side of the first air sending chamber 510.

The first energization unit 514 energizes the first heater 511. The energized first heater 511 heats air in the first air sending chamber 510. The first drive unit 513 drives the first centrifugal fan 512. The driven first centrifugal fan 512 blows air in the first air sending chamber 510 into the accommodation space 1A through the plurality of first blow-out hole portions 10E1. Further, the driven first centrifugal fan 512 draws the air in the accommodation space 1A into the first air sending chamber 510 through the plurality of first intake hole portions 10E2. The plurality of first intake hole portions 10E2 face the first centrifugal fan 512 in an axial direction of the first centrifugal fan 512. The first heater 511 is, for example, a sheathed heater. The first drive unit 513 is, for example, a motor.

The second air sending unit 52 supplies the second hot air H2 into the accommodation space 1A. In other words, the second air sending unit 52 executes the second hot air circulation heating mode. The second air sending unit 52 is attached to the outer side of the upper wall 10C. The upper wall 10C includes a plurality of second blow-out hole portions 10C1 and a plurality of second intake hole portions 10C2. The plurality of second blow-out hole portions 10C1 and the plurality of second intake hole portions 10C2 are located at a substantially center portion of the upper wall 10C.

The second air sending unit 52 includes a second air sending chamber 520, a second heater 521, a second centrifugal fan 522, a second drive unit 523, and a second energization unit 524. The second heater 521 and the second centrifugal fan 522 are accommodated in the second air sending chamber 520. The second drive unit 523 and the second energization unit 524 are located on the outer side of the second air sending chamber 520.

The second energization unit 524 energizes the second heater 521. The energized second heater 521 heats air in the second air sending chamber 520. The second drive unit 523 drives the second centrifugal fan 522. The driven second centrifugal fan 522 blows air in the second air sending chamber 520 into the accommodation space 1A through the plurality of second blow-out hole portions 10C1. Further, the driven second centrifugal fan 522 draws air in the accommodation space 1A into the second air sending chamber 520 through the plurality of second intake hole portions 10C2. The plurality of second intake hole portions 10C2 face the second centrifugal fan 522 in an axial direction of the second centrifugal fan 522. The second heater 521 is, for example, a sheathed heater. The second drive unit 523 is, for example, a motor.

The microwave supply unit 53 supplies microwaves into the accommodation space 1A. In other words, the microwave supply unit 53 executes the microwave heating mode. The microwave supply unit 53 is attached to the bottom wall 10D.

As illustrated in FIG. 8, the microwave supply unit 53 includes a magnetron 531, a rotary antenna 532, a waveguide 533, and an antenna motor 534. The bottom wall 10D includes a recessed portion 10D1. The recessed portion 10D1 is located at a substantially center portion of the bottom wall 10D. The heating cooking chamber 10 includes an oven tray 530. The oven tray 530 is attached to the bottom wall 10D. The oven tray 530 is a plate-like member. The oven tray 530 covers the recessed portion 10D1. The oven tray 530 and the recessed portion 10D1 form a space 10D2 therebetween.

The rotary antenna 532 is located in the space 10D2. The magnetron 531, the waveguide 533, and the antenna motor 534 are located on the outer side of the recessed portion 10D1. The magnetron 531 generates microwaves. The recessed portion 10D1 includes a power supply hole portion 10D3. The waveguide 533 propagates the generated microwaves to the power supply hole portion 10D3. As a result, the microwaves are supplied into the accommodation space 1A via the rotary antenna 532. The antenna motor 534 drives the rotary antenna 532. The rotary antenna 532 agitates the microwaves and radiates the microwaves into the accommodation space 1A.

The material of the oven tray 530 includes ceramic or glass. Because the material of the oven tray 530 includes ceramic or glass, the oven tray 530 facilitates transmission of the microwaves. Therefore, when the microwave heating mode is executed, the heating cooking apparatus 1 can efficiently heat and cook an object to be heated even when the microwaves are supplied from the recessed portion 10D1.

The grill unit 54 supplies heat into the accommodation space 1A. The grill unit 54 executes the grill heating mode. The grill unit 54 includes a heating cooking heater unit 541 and a third energization unit 542. The heating cooking heater unit 541 is located at an upper portion in the accommodation space 1A. The third energization unit 542 is located outside the left wall 10B. The third energization unit 542 projects from the outer surface of the left wall 10B of the heating cooking chamber 10. The third energization unit 542 energizes the heating cooking heater unit 541. The energized heating cooking heater unit 541 generates and radiates heat. The heating cooking heater unit 541 is, for example, a U-shaped sheathed heater.

Figure 9:
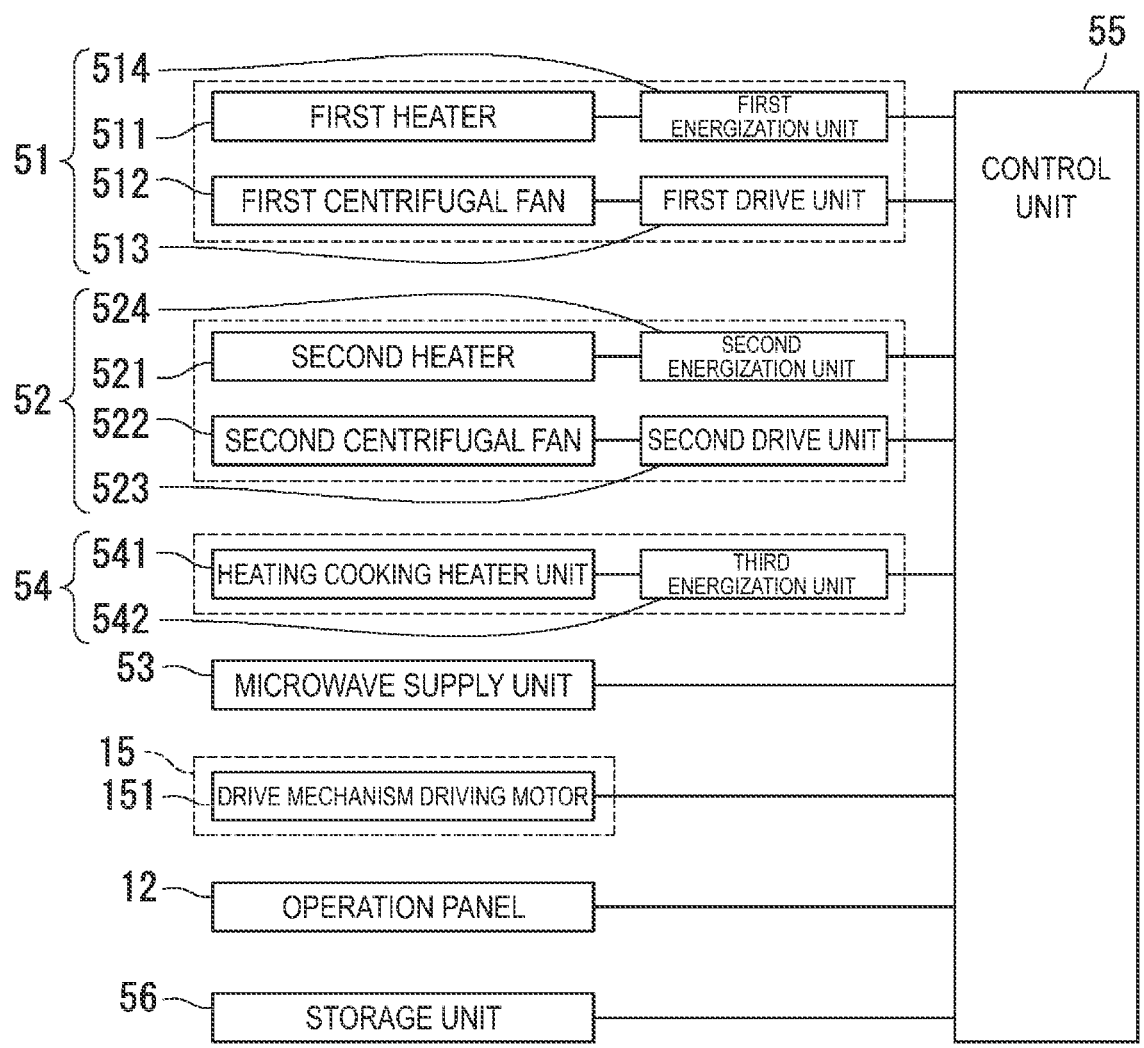
FIG. 9 is a block diagram illustrating a configuration of the heating cooking apparatus according to the embodiment of the present invention.

The configuration of the heating cooking apparatus 1 will be further described with reference to FIG. 9. FIG. 9 is a block diagram illustrating the configuration of the heating cooking apparatus 1 according to the present embodiment.

As illustrated in FIG. 9, the heating cooking apparatus 1 further includes a control unit 55 and a storage unit 56.

The control unit 55 is a hardware circuit. The hardware circuit includes a processor such as a Central Processing Unit (CPU). The control unit 55 executes control programs stored in the storage unit 56 to thereby control the operation panel unit 12, the first drive unit 513, the first energization unit 514, the second drive unit 523, the second energization unit 524, the third energization unit 542, the microwave supply unit 53, and the storage unit 56.

The storage unit 56 includes a Random Access Memory (RAM) and a Read Only Memory (ROM). The storage unit 56 stores control programs used for controlling operation of each portion of the heating cooking apparatus 1. The storage unit 56 stores setting information input by operating the operation panel unit 12.

Figure 10:
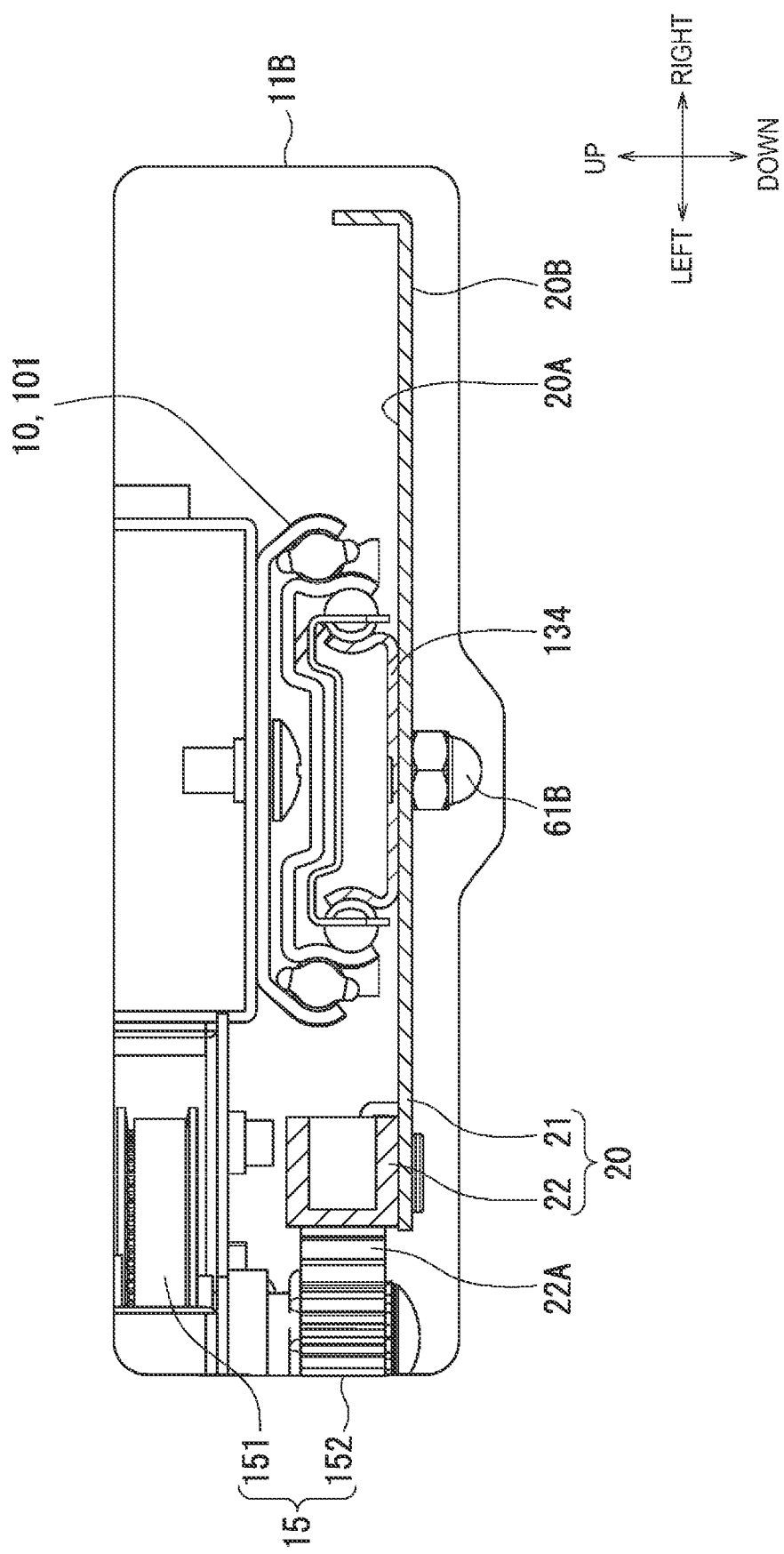
FIG. 10 is a partial cross-sectional view of a heating cooking apparatus 1 along a section line X in FIG. 5.
Figure 11:
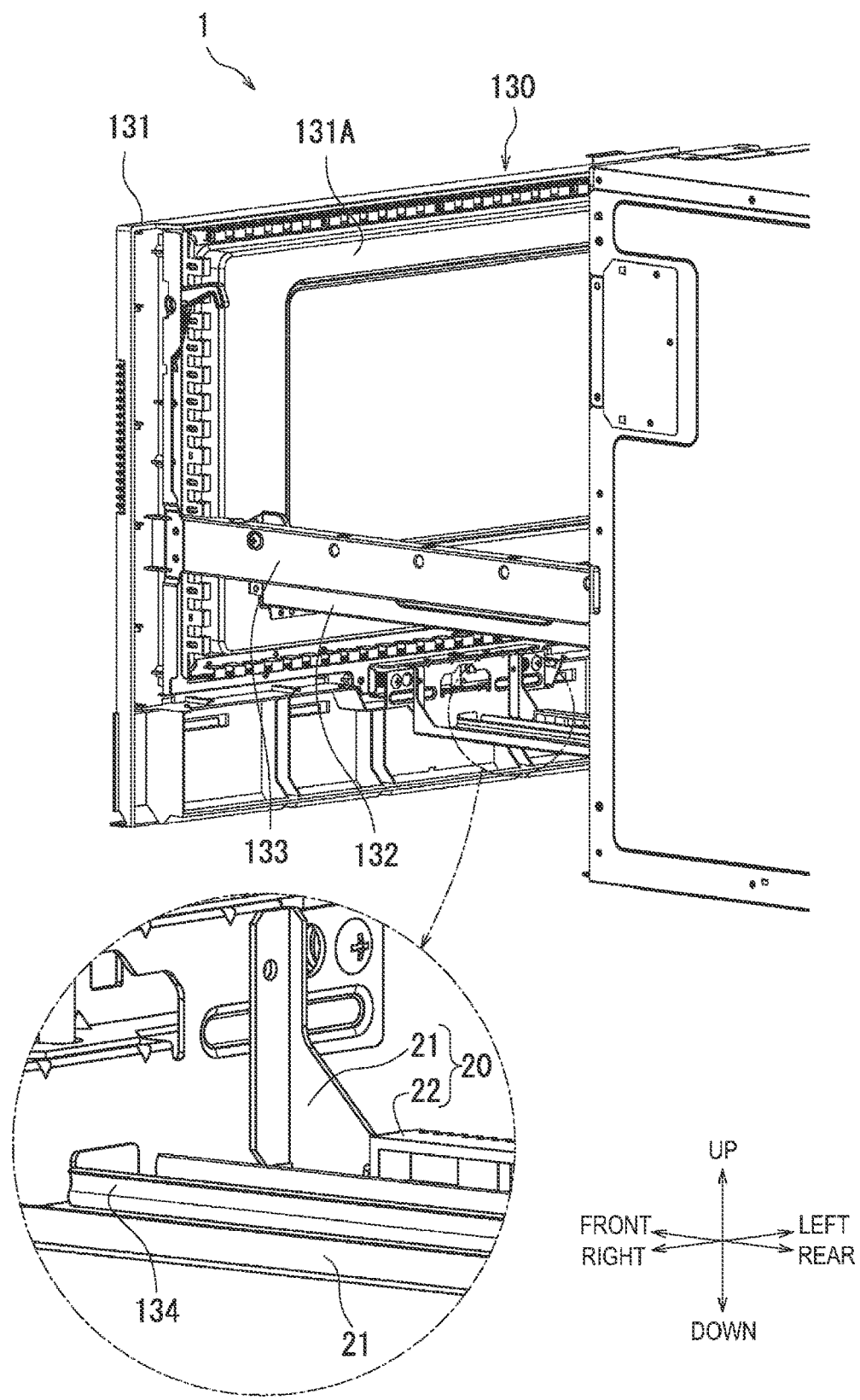
FIG. 11 is a perspective view of an appearance of the heating cooking apparatus according to the embodiment of the present invention.
Figure 12:
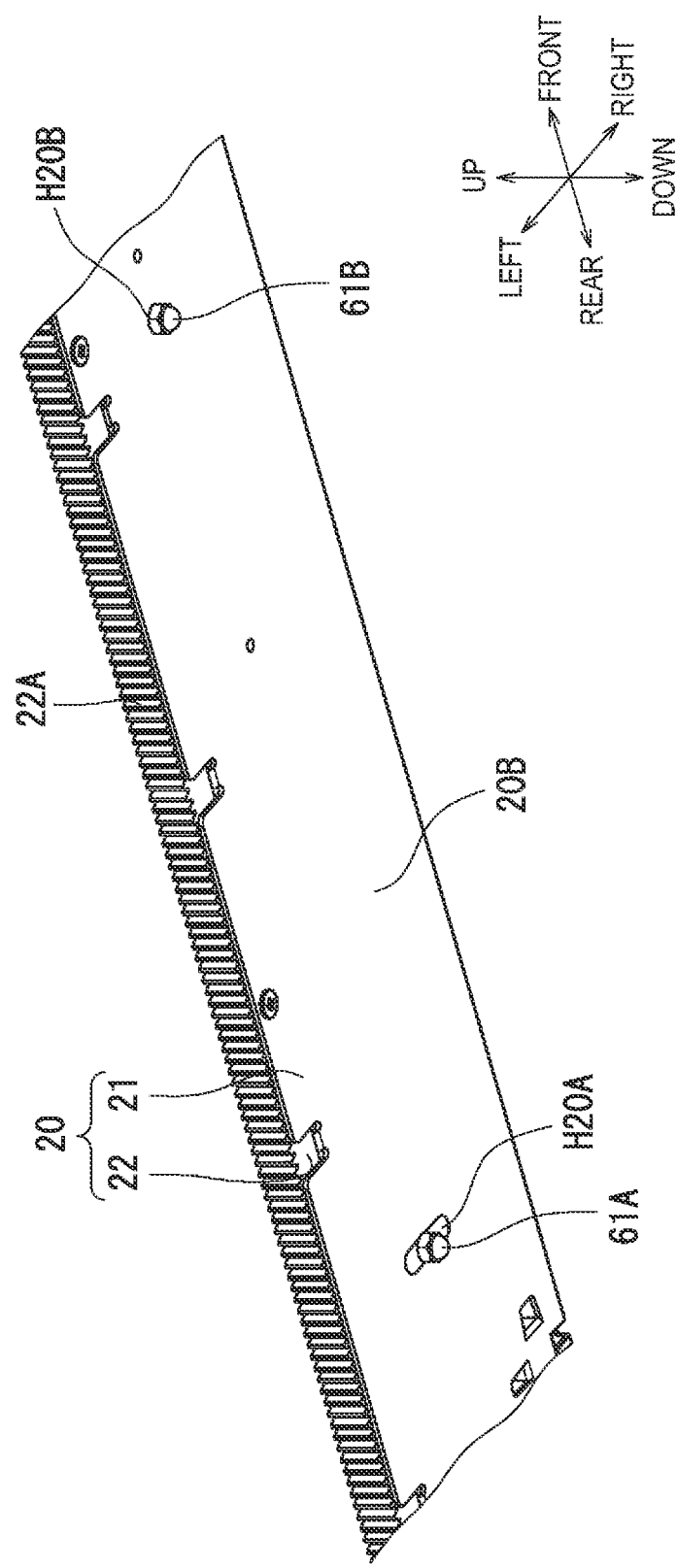
FIG. 12 is a perspective view of an appearance of a support member according to the embodiment of the present invention.

Next, the support member 20 and the drive mechanism 15 will be described with reference to FIG. 1 to FIG. 12. FIG. 10 is a partial cross-sectional view of the heating cooking apparatus 1 along a section line X in FIG. 5. FIG. 11 is a perspective view illustrating an appearance of the heating cooking apparatus 1 according to the present embodiment. Specifically, FIG. 11 illustrates an appearance of the heating cooking apparatus 1 in an upper right diagonal direction from behind in a state where the pull-out body 130 is pulled out. FIG. 12 is a perspective view illustrating an appearance of the support member 20 according to the present embodiment. Specifically, FIG. 12 illustrates an appearance of the support member 20 in a lower left diagonal direction from the front.

As illustrated in FIG. 10, the heating cooking chamber 10 further includes a guide rail portion 101. The guide rail portion 101 guides the support member 20 in the pull-out direction of the pull-out body 130. The guide rail portion 101 is located at a lower portion of the heating cooking chamber 10. The guide rail portion 101 extends in the front-rear direction.

The pull-out body 130 further includes an engagement portion 134. The engagement portion 134 engages with the guide rail portion 101. The support member 20 includes an upper surface 20A. The engagement portion 134 is pivotally attached to the upper surface 20A of the support member 20 by a fastening screw 61A (see FIG. 12) and a shaft screw 61B (see FIG. 12). The engagement portion 134 has a substantially U-shaped cross section. As illustrated in FIG. 5, the engagement portion 134 extends in the front-rear direction. In the present embodiment, the fastening screws 61A and the shaft screw 61B are hexagonal bolts. The fastening screw 61A is an example of a second fastening member. The shaft screw 61B is an example of a second shaft member.

The support member 20 can be used to adjust the angle of the rear surface 131A (see FIG. 11) of the pull-out body 130 relative to the front surface 11D (see FIG. 6) of the heating cooking chamber 10. Hereinafter, the angle of the rear surface 131A (see FIG. 11) of the pull-out body 130 relative to the front surface 11D (see FIG. 6) of the heating cooking chamber 10 will be referred to as a "sealing angle". When the sealing angle is substantially 0 degrees, the accommodation space 1A of the heating cooking chamber 10 is sealed by the lid portion 131 of the pull-out body 130. Thus, the heating cooking apparatus 1 can prevent leakage of electric waves from the heating cooking chamber 10 when the microwave supply unit 53 is driven.

As illustrated in FIG. 11 and FIG. 12, the support member 20 includes a base plate portion 21 and a rack portion 22. The base plate portion 21 and the rack portion 22 are integrated.

As illustrated in FIG. 12, the base plate portion 21 is a plate-like object with the front-rear direction as a longitudinal direction. The engagement portion 134 described with reference to FIG. 5 and FIG. 10 includes a front fixing hole. The front fixing hole of the engagement portion 134 is a screw hole to which the shaft screw 61B (see FIG. 12) is fixed. The front fixing hole of the engagement portion 134 is located at a front portion of the engagement portion 134. The base plate portion 21 includes a pivotally support hole portion H20B facing the front fixing hole of the engagement portion 134. The pivotally support hole portion H20B is a through hole with which the support member 20 is pivotally supported to the engagement portion 134.

The shaft screw 61B is fixed to the front fixing hole of the engagement portion 134 through the pivotally support hole portion H20B of the support member 20. Thereby, the support member 20 can pivot relative to the engagement portion 134 with the shaft screw 61B as a center. The engagement portion 134 engages with the guide rail portion 101 (see FIG. 10) and is fixed to the guide rail portion 101. The pivotally support hole portion H20B of the support member 20 is an example of a pivotally support portion.

The engagement portion 134 described with reference to FIG. 5 and FIG. 10 includes a rear attachment hole. The rear attachment hole of the engagement portion 134 is a screw hole to which the fastening screw 61A (see FIG. 12) is fixed. The rear attachment hole of the engagement portion 134 is located at a rear portion of the engagement portion 134. The base plate portion 21 includes a left-right regulating hole portion H20A facing the rear attachment hole of the engagement portion 134. The left-right regulating hole portion H20A is a screw hole for regulating the pivot direction of the support member 20 in a substantially left-right direction. The left-right regulating hole portion H20A is an elongate hole with the substantially left-right direction as a longitudinal direction. The rear attachment hole of the engagement portion 134 is an example of a second fixing portion. The left-right regulating hole portion H20A of the support member 20 is an example of a left-right regulating portion.

The fastening screw 61A fastens the support member 20. Specifically, when the fastening screw 61A is screwed to the rear fixing hole of the engagement portion 134 and then fixed to the rear fixing hole of the engagement portion 134, the fastening screw 61A fastens the support member 20.

In addition, the fastening screw 61A regulates the pivot direction of the support member 20. When the fastening screw 61A is loosened, the fastening screw 61A regulates the pivot direction of the support member 20 in the substantially left-right direction along the shape of the elongate hole of the left-right regulating hole portion H20A of the support member 20.

Hereinafter, a state where the support member 20 can pivot freely relative to the engagement portion 134 will be referred to as a "pivoting state" of the fastening screw 61A. Hereinafter, a state where the arrangement of the support member 20 relative to the engagement portion 134 is fixed will be referred to as a "fastened state" of the fastening screw 61A.

The rack portion 22 is a substantially rectangular parallelepiped-like object with the front-rear direction as a longitudinal direction. As illustrated in FIG. 10, the rack portion 22 is attached to a left end portion of the upper surface 20A of the base plate portion 21. As illustrated in FIG. 12, the rack portion 22 includes a plurality of teeth 22A along the front-rear direction.

As illustrated in FIG. 5, the heating cooking apparatus 1 includes the drive mechanism 15. The heating cooking apparatus 1 has an arrangement space between the outer surface of the bottom wall 10D of the heating cooking chamber 10 and the inner surface of the bottom wall 14D of the housing 14. The drive mechanism 15 is located in the arrangement space. The drive mechanism 15 includes a drive mechanism driving motor 151 and a pinion 152. The control unit 55 described with reference to FIG. 9 controls the drive mechanism driving motor 151. The control unit 55 controls the drive mechanism driving motor 151 to generate driving force for rotating the pinion 152 in a forward direction or a reverse direction. The pinion 152 meshes with the rack portion 22 of the support member 20. The drive mechanism 15 sets the pull-out body 130 to be in an opened state or a closed state by rotating the pinion 152 in a forward direction or a reverse direction. The opened state of the pull-out body 130 indicates a state where the placing portion 132 of the pull-out body 130 is pulled out from the arrangement space. The closed state of the pull-out body 130 indicates a state where the placing portion 132 of the pull-out body 130 is pulled into the arrangement space, and the front surface 11D of the heating cooking chamber 10 and the rear surface 131A of the pull-out body 130 abut against each other.

Figure 13:
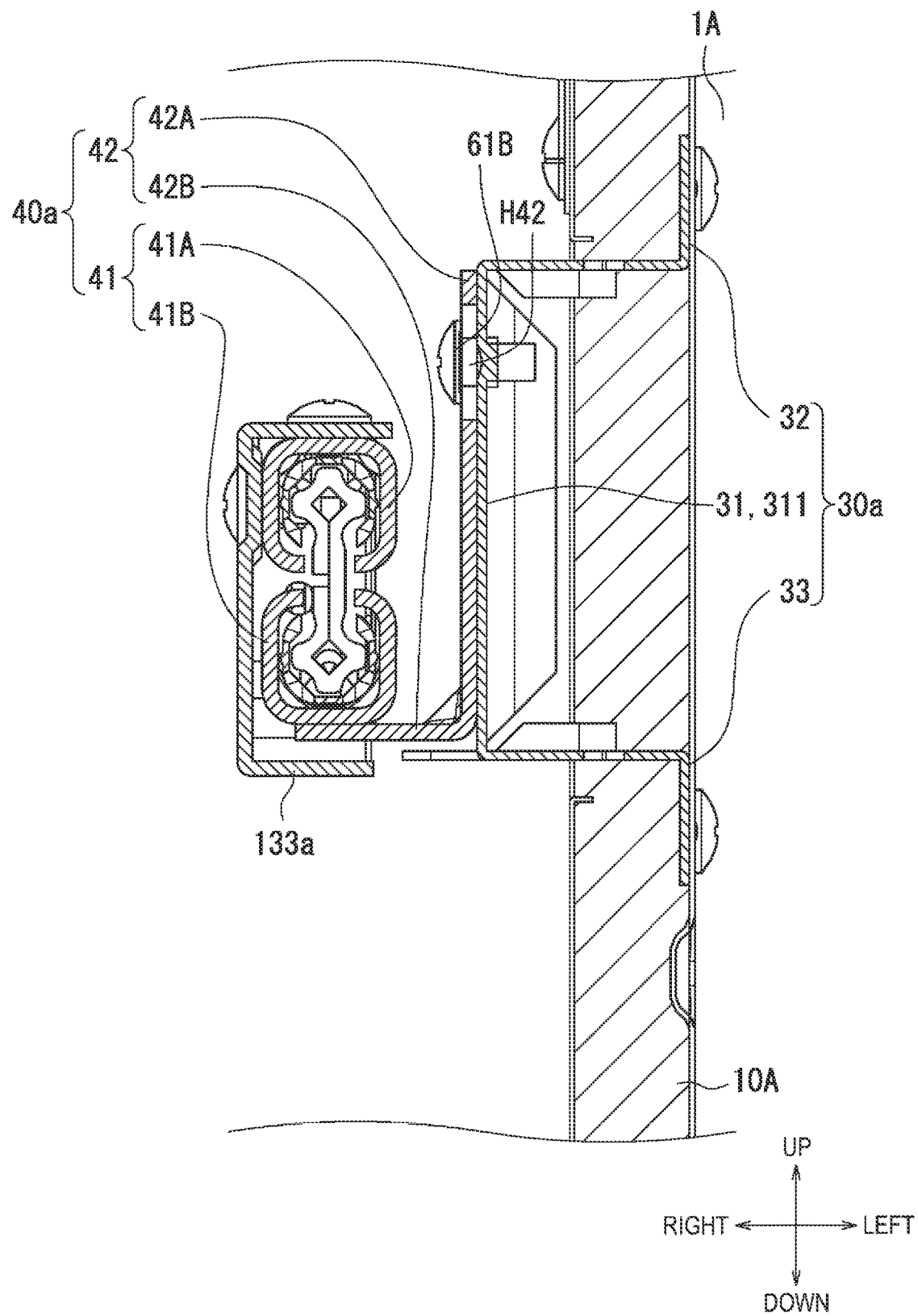
FIG. 13 is a partial cross-sectional view of the heating cooking apparatus 1 along a section line XIII in FIG. 3.
Figure 14:
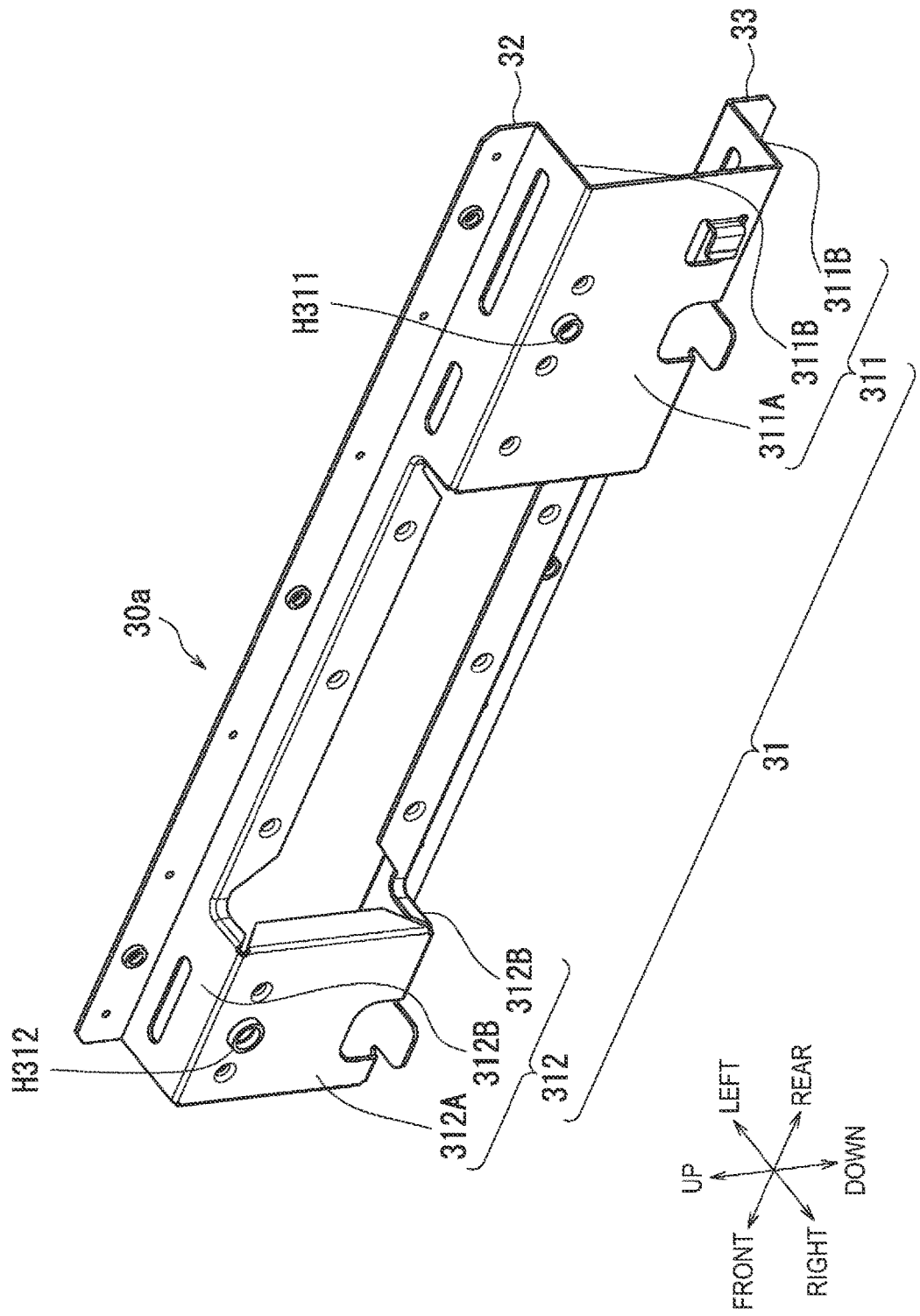
FIG. 14 is a perspective view of the right support portion according to the embodiment of the present invention.

Next, the configuration of the right attachment portion 30a will be further described with reference to FIG. 1 to FIG. 14. FIG. 13 is a partial cross-sectional view of the heating cooking apparatus 1 along a section line XIII in FIG. 3. Specifically. FIG. 13 illustrates the cross-sections of the right wall 10A, the right attachment portion 30a, the right slide rail 40a, and the right slide member 133a. FIG. 14 is a perspective view of the right attachment portion 30a according to the present embodiment. Specifically, FIG. 14 illustrates the right attachment portion 30a in an upper right diagonal direction from behind.

As illustrated in FIG. 13, the right attachment portion 30a includes a main body portion 31, a first flange portion 32, and a second flange portion 33. The main body portion 31, the first flange portion 32, and the second flange portion 33 are integrated. A left portion of the main body portion 31, the first flange portion 32, and the second flange portion 33 are embedded in the right wall 10A.

The first flange portion 32 extends upward from a left edge portion of an upper portion of the main body portion 31. The first flange portion 32 is attached to the right wall 10A. As illustrated in FIG. 14, the first flange portion 32 is formed along the front-rear direction of the main body portion 31.

As illustrated in FIG. 13, the second flange portion 33 extends downward from a left edge portion of a lower portion of the main body portion 31. The second flange portion 33 is attached to the right wall 10A. As illustrated in FIG. 14, the second flange portion 33 is formed along the front-rear direction of the main body portion 31.

The main body portion 31 includes a rear fixing portion 311 and a front fixing portion 312. The rear fixing portion 311 is located at a rear portion of the main body portion 31 in the front-rear direction. The front fixing portion 312 is located at a front portion of the main body portion 31 in the front-rear direction. The rear fixing portion 311 and the front fixing portion 312 are groove-like object having a substantially U-shaped cross-section and having the front-rear direction as a longitudinal direction.

Figure 15:
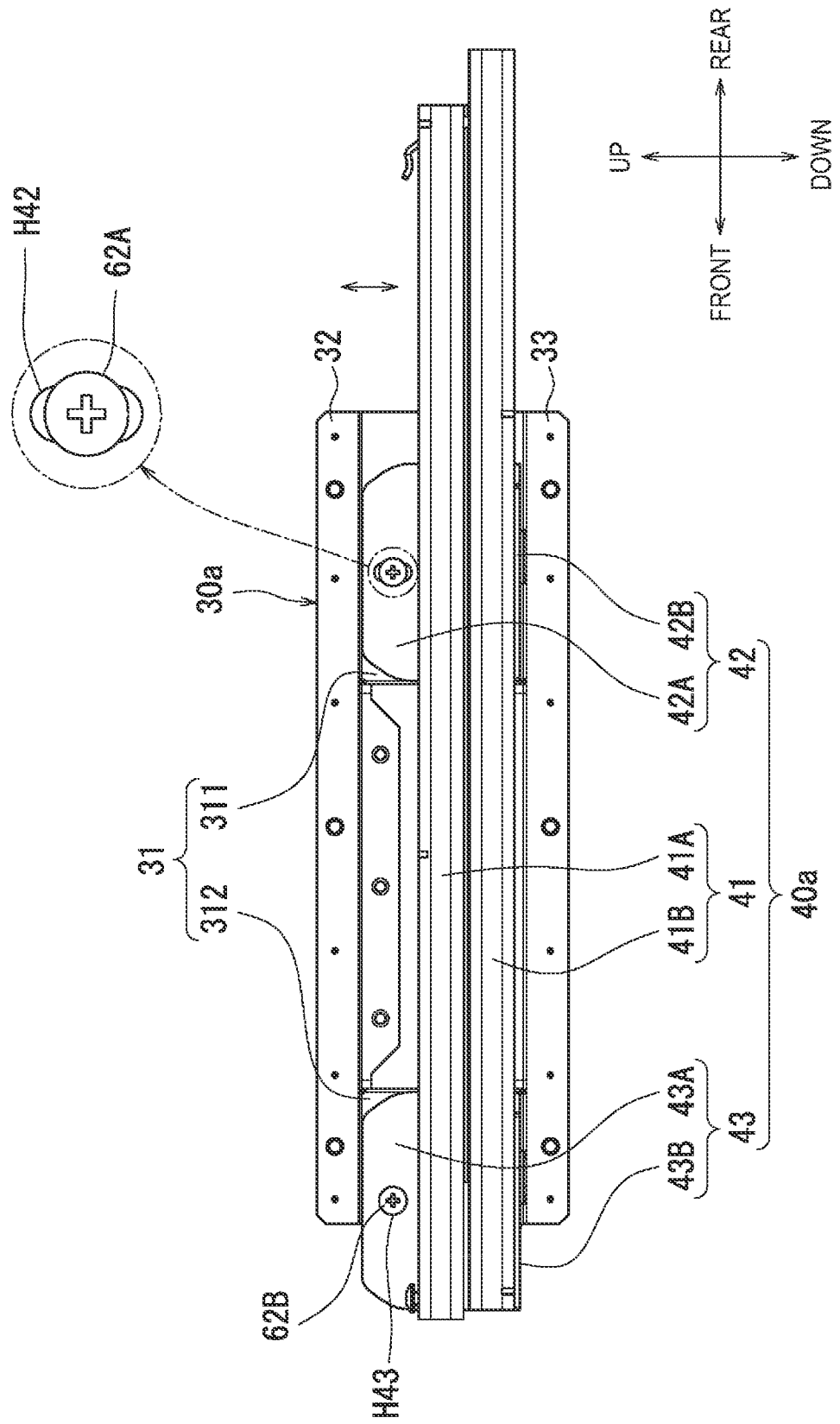
FIG. 15 is a front view of the right support portion to which a right slide rail according to the embodiment of the present invention is attached.

The rear fixing portion 311 is a portion where a rear attachment support portion 42 of the right slide rail 40a to be described below with reference to FIG. 15 is fixed (see FIG. 13). The rear fixing portion 311 includes a rear facing wall 311A and a pair of rear standing walls 311B. One of the pair of rear standing walls 311B is provided to stand leftward from an upper edge portion of the rear facing wall 311A. The other one of the pair of rear standing walls 311B is provided to stand leftward from a lower edge portion of the rear facing wall 311A. The rear facing wall 311A and the pair of rear standing walls 311B are integrated.

The rear facing wall 311A faces the outer surface of the right wall 10A. The rear facing wall 311A is a flat plate-like object. The rear facing wall 311A includes a rear fixing hole portion H311. The rear fixing hole portion H311 is a screw hole to which a fastening screw 62A to be described with reference to FIG. 15 is fixed. The rear fixing hole portion H311 is located at the center portion in the front-rear direction and an upper portion of the rear facing wall 311A. The rear fixing hole portion H311 is an example of a first fixing portion. The fastening screw 62A is an example of a first fastening member.

The front fixing portion 312 is a portion to which the front attachment support portion 43 of the right slide rail 40a to be described below with reference to FIG. 15 is fixed. As illustrated in FIG. 14, the front fixing portion 312 includes a front facing wall 312A and a pair of front standing walls 312B. One of the pair of front standing walls 312B is provided to stand leftward from an upper edge portion of the front facing wall 312A. The other one of the pair of front standing walls 312B is provided to stand leftward from a lower edge portion of the front facing wall 312A. The front facing wall 312A and the pair of front standing walls 312B are integrated.

The front facing wall 312A faces the outer surface of the right wall 10A. The front facing wall 312A is a flat plate-like object. The front facing wall 312A includes a front fixing hole portion H312. The front fixing hole portion H312 is a screw hole into which a shaft screw 62B to be described below with reference to FIG. 15 is screwed. The front fixing hole portion H312 is located at the center portion in the front-rear direction and at an upper portion of the front facing wall 312A. The shaft screw 62B is an example of a first shaft member.

Figure 16:
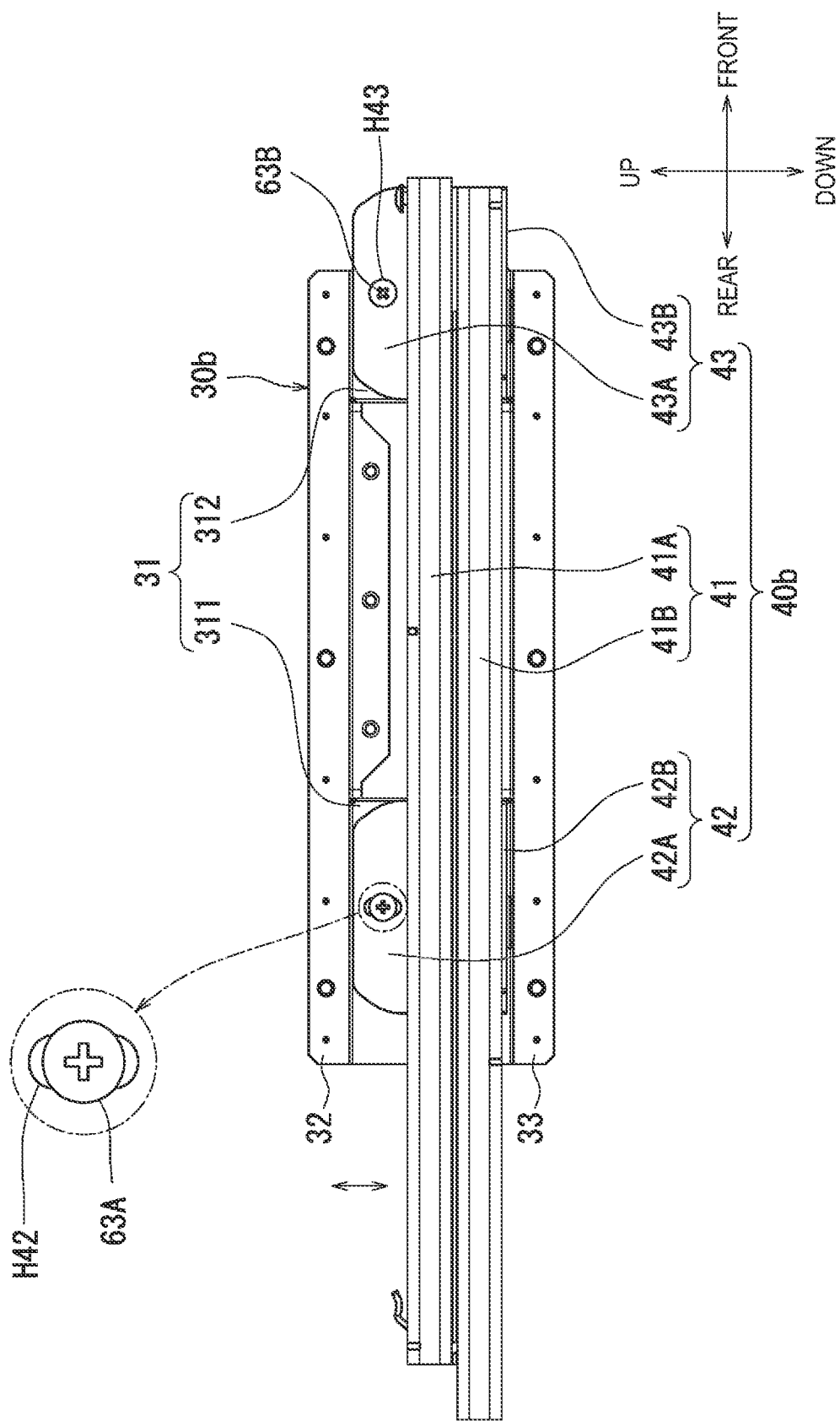
FIG. 16 is a front view of a left support portion to which a left slide rail according to the embodiment of the present invention is attached.

Next, the configurations of the pair of left and right slide rails 40 will be further described with reference to FIG. 1 to FIG. 16. FIG. 15 is a front view of the right attachment portion 30a to which the right slide rail 40a according to the present embodiment is attached. Specifically. FIG. 15 illustrates the right attachment portion 30a to which the right slide rail 40a is attached, as viewed from the right. FIG. 16 is a front view of the left attachment portion 30b to which the left slide rail 40b according to the present embodiment is attached. Specifically, FIG. 16 illustrates the left attachment portion 30b to which the left slide rail 40b is attached, as viewed from the left.

The pair of left and right slide rails 40 can be used for adjusting the sealing angle. As illustrated in FIG. 15, the right slide rail 40a includes a rail portion 41, a rear attachment support portion 42, and a front attachment support portion 43. The rail portion 41, the rear attachment support portion 42, and the front attachment support portion 43 are integrated.

The rail portion 41 engages with the right slide member 133a described with reference to FIG. 3. The rail portion 41 slidably supports the right slide member 133a. The rail portion 41 includes an upper rail portion 41A and a lower rail portion 41B. The upper rail portion 41A and the lower rail portion 41B are installed side by side in the up-down direction. The upper rail portion 41A and the lower rail portion 41B are rail-like objects with the front-rear direction as a longitudinal direction. In the present embodiment, the length of the upper rail portion 41A is shorter than the length of the lower rail portion 41B in the front-rear direction.

As illustrated in FIG. 13, the rear attachment support portion 42 supports the rail portion 41 and is attached to the rear fixing portion 311 of the right attachment portion 30a. The rear attachment support portion 42 is a bracket having a substantially L-shaped cross-section. The rear attachment support portion 42 includes a rear base plate portion 42A and a rear support plate portion 42B. The rear support plate portion 42B extends rightward from a lower edge portion of the rear base plate portion 42A. The rear base plate portion 42A and the rear support plate portion 42B are integrated.

As illustrated in FIG. 15, the rear base plate portion 42A is a flat plate-like object. The rear base plate portion 42A has an up-down regulating hole portion H42 of the right slide rail 40a. The up-down regulating hole portion H42 of the right slide rail 40a is a screw hole for regulating the pivot direction of the right slide rail 40a in the up-down direction. The fastening screw 62A is inserted into the up-down regulating hole portion H42 of the right slide rail 40a. The up-down regulating hole portion H42 of the right slide rail 40a faces the rear fixing hole portion H311 (see FIG. 14) of the right attachment portion 30a. The up-down regulating hole portion H42 of the right slide rail 40a is an elongate hole with the up-down direction as a longitudinal direction. The up-down regulating hole portion H42 of the right slide rail 40a is an example of an up-down regulating portion.

As will be described below with reference to FIG. 15, the right slide rail 40a can pivot relative to the right attachment portion 30a with the shaft screw 62B as a center.

The fastening screw 62A fastens the right slide rail 40a. Specifically, when the fastening screw 62A is screwed to the rear fixing hole portion H311 (see FIG. 14) of the right attachment portion 30a and then fixed to the rear fixing hole portion H311 (see FIG. 14) of the right attachment portion 30a, the fastening screw 62A fastens the right slide rail 40a.

The fastening screw 62A regulates the pivot direction of the right slide rail 40a. Specifically, when the fastening screw 62A is loosened, the fastening screw 62A regulates the pivot direction of the right slide rail 40a in the substantially up-down direction along the shape of the elongate hole of the up-down regulating hole portion H42 of the right slide rail 40a.

In the present embodiment, the fastening screw 62A is a machine screw. Hereinafter, a state where the right slide rail 40a can pivot freely relative to the right attachment portion 30a will be referred to as a "pivoting state" of the fastening screw 62A. Hereinafter, a state where the arrangement of the right slide rail 40a relative to the right attachment portion 30a is fixed will be referred to as a "fastened state" of the fastening screw 62A.

The rear support plate portion 42B is a flat plate-like object. As illustrated in FIG. 13, the rail portion 41 is placed on the rear support plate portion 42B. The rail portion 41 is fixed to the rear support plate portion 42B.

As illustrated in FIG. 15, the front attachment support portion 43 supports the rail portion 41 and is attached to the front fixing portion 312 (see FIG. 14) of the right attachment portion 30a. The front attachment support portion 43 is a bracket having a substantially L-shaped cross-section, similarly to the rear attachment support portion 42. The front attachment support portion 43 includes a front base plate portion 43A and a front support plate portion 43B. The front support plate portion 43B extends rightward from a lower edge portion of the front base plate portion 43A. The front base plate portion 43A and the front support plate portion 43B are integrated.

The front base plate portion 43A is a flat plate-like object. The front base plate portion 43A includes a pivotally support hole portion H43. The pivotally support hole portion H43 of the right slide rail 40a is a through hole with which the right slide rail 40a is pivotally supported to the right attachment portion 30a. The shaft screw 62B is inserted into the pivotally support hole portion H43 of the right slide rail 40a. The pivotally support hole portion H43 of the right slide rail 40a faces the front fixing hole portion H312 (see FIG. 14) of the right attachment portion 30a.

The shaft screw 62B is screwed into the front fixing hole portion H312 of the right attachment portion 30a through the pivotally support hole portion H43 of the right slide rail 40a, and thus the right slide rail 40a can pivot relative to the right attachment portion 30a with the shaft screw 62B as a center. In the present embodiment, the shaft screw 62B is a machine screw. The pivotally support hole portion H43 of the right slide rail 40a is an example of a pivotally support portion.

The front support plate portion 43B is a flat plate-like object. The rail portion 41 is placed on the front support plate portion 43B. The rail portion 41 is fixed to the front support plate portion 43B.

As illustrated in FIG. 16, the configuration of the left attachment portion 30b is substantially the same as the configuration of the right attachment portion 30a. The configuration of the left slide rail 40b is substantially the same as the configuration of the right slide rail 40a.

The pivotally support hole portion H43 of the left slide rail 40b is a through hole with which the left slide rail 40b is pivotally supported to the left attachment portion 30b. A shaft screw 63B is inserted into the pivotally support hole portion H43 of the left slide rail 40b.

The shaft screw 63B is screwed into the front fixing hole portion H312 of the left attachment portion 30b through the pivotally support hole portion H43 of the left slide rail 40b, and thus the left slide rail 40b can pivot relative to the left attachment portion 30b with the shaft screw 63B as a center. In the present embodiment, the shaft screw 63B is a machine screw. The pivotally support hole portion H43 of the left slide rail 40b is an example of a pivotally support portion.

The up-down regulating hole portion H42 of the left slide rail 40b is a through hole for regulating the pivot direction of the left slide rail 40b in the up-down direction. The fastening screw 63A is inserted into the up-down regulating hole portion H42 of the left slide rail 40b. The up-down regulating hole portion H42 of the left slide rail 40b is an example of an up-down regulating portion.

The fastening screw 63A fastens the left slide rail 40b. Specifically, when the fastening screw 63A is screwed to the rear fixing hole portion H311 of the left attachment portion 30b and then fixed to the rear fixing hole portion H311 of the left attachment portion 30b, the fastening screw 63A fastens the left slide rail 40b.

The fastening screw 63A regulates the pivot direction of the left slide rail 40b. Specifically, when the fastening screw 63A is loosened, the fastening screw 63A regulates the pivot direction of the left slide rail 40b in the substantially up-down direction along the shape of the elongate hole of the up-down regulating hole portion H42 of the left slide rail 40b.

In the present embodiment, the fastening screw 63A is a machine screw. Hereinafter, a state where the left slide rail 40b can pivot freely relative to the left attachment portion 30b will be referred to as a "pivoting state" of the fastening screw 63A. Hereinafter, a state where the arrangement of the left slide rail 40b relative to the left attachment portion 30b is fixed will be referred to as a "fastened state" of the fastening screw 63A.

Next, an adjustment mechanism for the arrangement of the pull-out body 130 to prevent the leakage of electric waves will be described with reference to FIG. 1 to FIG. 16.

In order to prevent the leakage of electromagnetic waves, it is desirable that the accommodation space 1A of the heating cooking chamber 10 is sealed by the lid portion 131 of the pull-out body 130. In other words, in order to prevent leakage of electromagnetic waves, it is desirable to set the sealing angle to substantially 0 degrees.

In the present embodiment, for example, when the pull-out body 130 is set to be in a closed state in a case where the fastening screw 61A, the fastening screw 62A, and the fastening screw 63A are in the pivoting state, the front surface 11D of the heating cooking chamber 10 and the rear surface 131A of the pull-out body 130 abut against each other. When the front surface 11D of the heating cooking chamber 10 and the rear surface 131A of the pull-out body 130 abut against each other, the arrangement of the pull-out body 130 relative to the heating cooking chamber 10 is efficiently adjusted such that the sealing angle is set to substantially 0 degrees. In the closed state of the pull-out body 130, when the fastening screw 61A, the fastening screw 62A, and the fastening screw 63A are set to be in the fastened state, the sealing angle is maintained at substantially 0 degrees. In this manner, in the present embodiment, it is possible to simply adjust the arrangement of the pull-out body 130 to prevent the leakage of electric waves.

In addition, in the present embodiment, when the pull-out body 130 is set to be in a closed state in a case where the fastening screw 62A and the fastening screw 63A are in the fastened state and the fastening screw 61A is in the pivoting state, the arrangement of the pull-out body 130 in the left-right direction is adjusted. In addition, when the pull-out body 130 is set to be in a closed state in a case where at least one of the fastening screws 62A or the fastening screws 63A is in the pivoting state and the fastening screw 61A is in the fastened state, the arrangement of the pull-out body 130 in the up-down direction is adjusted.

Figure 17:
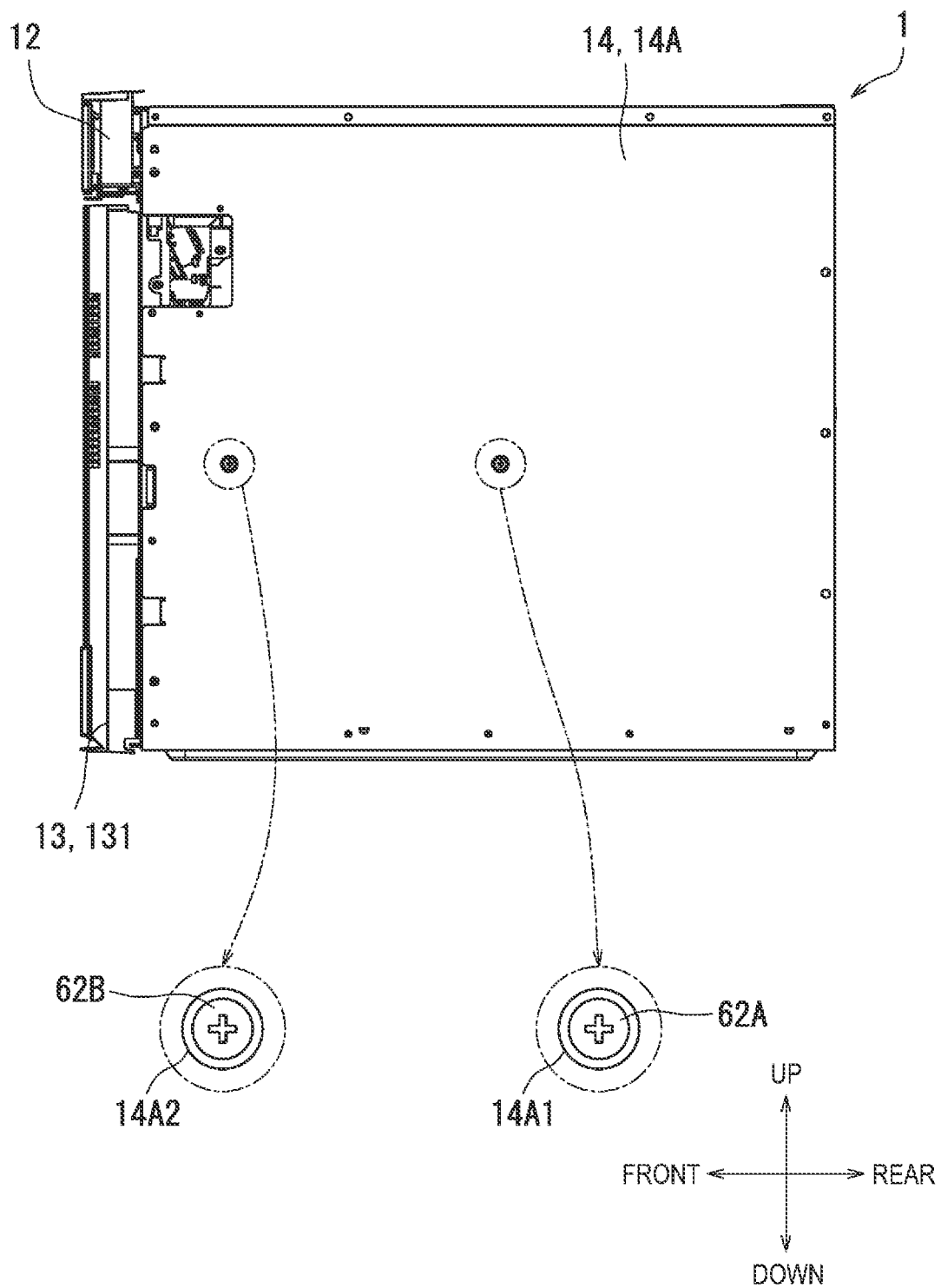
FIG. 17 is a diagram illustrating a right side surface of the heating cooking apparatus according to the embodiment of the present invention.
Figure 18:
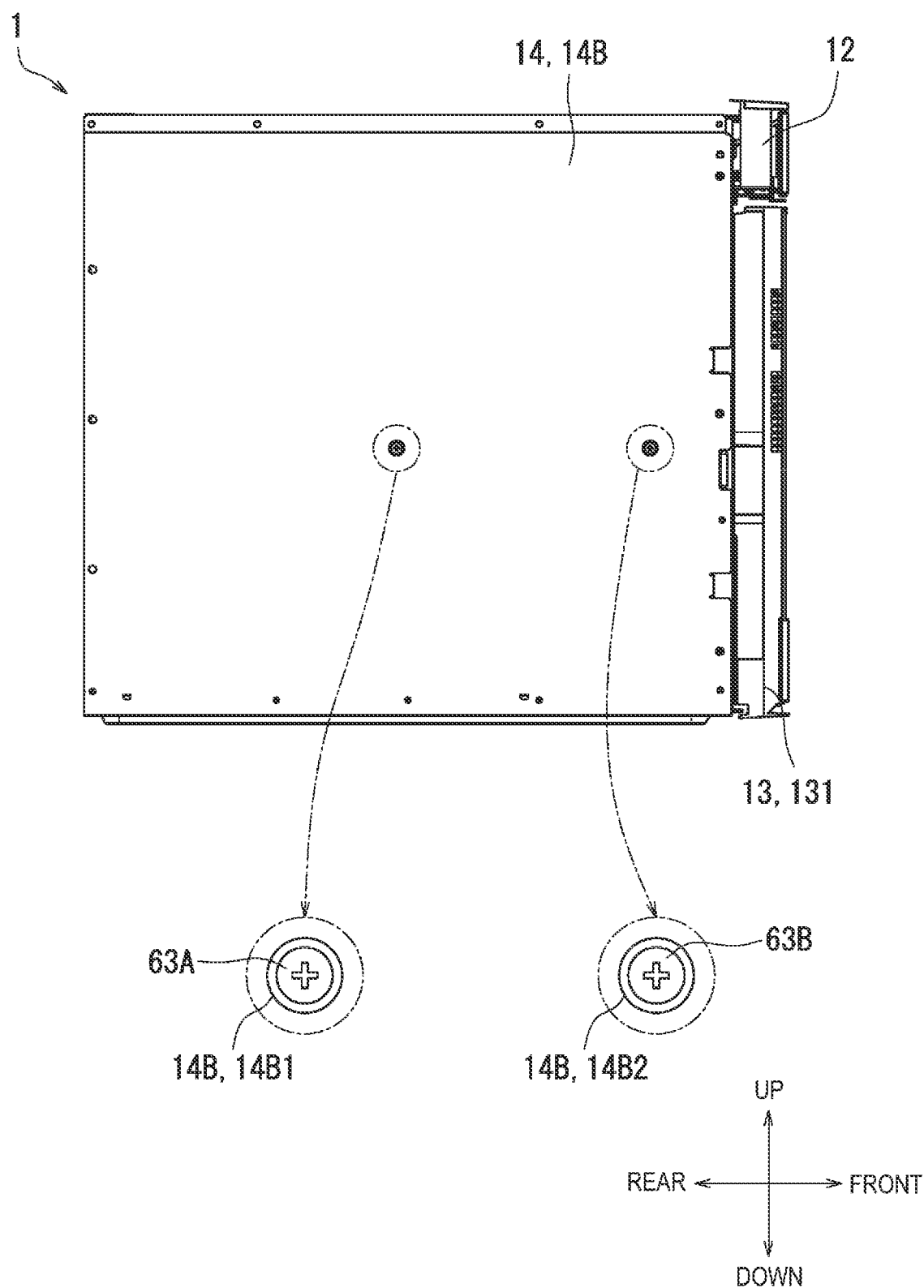
FIG. 18 is a diagram illustrating a left side surface of the heating cooking apparatus according to the embodiment of the present invention.
Figure 19:
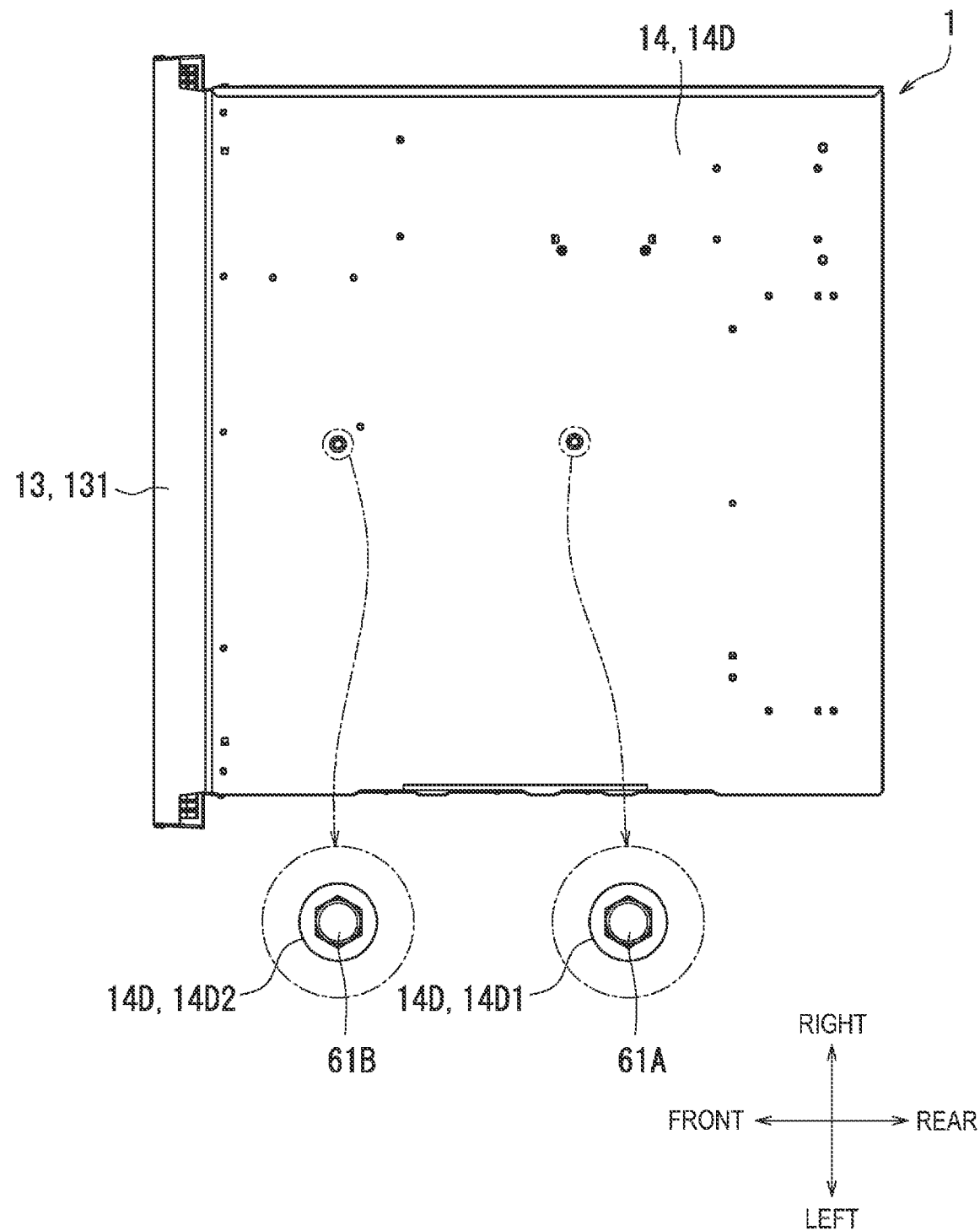
FIG. 19 is a diagram illustrating a bottom surface of the heating cooking apparatus according to the embodiment of the present invention.

Next, an adjustment mechanism for a fastening condition of each of the fastening screw 61A, the fastening screw 62A, and the fastening screws 63A will be described with reference to FIG. 1 to FIG. 19. FIG. 17 is a diagram illustrating a right side surface of the heating cooking apparatus 1 according to the present embodiment. Specifically, FIG. 17 illustrates the outer surface of the right wall 14A of the housing 14. FIG. 18 is a diagram illustrating a left side surface of the heating cooking apparatus 1 according to the present embodiment. Specifically, FIG. 18 illustrates the outer surface of the left wall 14B of the housing 14. FIG. 19 is a diagram illustrating a bottom surface of the heating cooking apparatus 1 according to the present embodiment. Specifically, FIG. 19 illustrates the outer surface of the bottom wall 14D of the housing 14.

As illustrated in FIG. 17, the right wall 14A of the housing 14 includes a first through hole 14A1 and a second through hole 14A2.

The first through hole 14A1 faces the rear fixing hole portion H311 of the right attachment portion 30a in the left-right direction. The fastening screw 62A (see FIG. 15) is screwed into the rear fixing hole portion H311 of the right attachment portion 30a. Thus, the first through hole 14A1 faces the fastening screw 62A. For this reason, for example, a user can simply adjust a fastening condition of the right slide rail 40a by the fastening screw 62A through the first through hole 14A1 by using a tool without removing the housing 14. The tool includes, for example, a screwdriver.

The housing 14 may include a first cover member that closes the first through hole 14A1. The first cover member can open the first through hole 14A1 in a case where a fastening condition of the fastening screw 62A is adjusted.

The second through hole 14A2 faces the front fixing hole portion H312 of the right attachment portion 30a in the left-right direction. The shaft screw 62B (see FIG. 15) is screwed into the front fixing hole portion H312 of the right attachment portion 30a. Thus, the second through hole 14A2 faces the shaft screw 62B. For this reason, for example, a user can simply adjust a fastening condition of the right slide rail 40a by the shaft screw 62B through the second through hole 14A2 by using a tool without removing the housing 14.

The housing 14 may include a second cover member that closes the second through hole 14A2. The second cover member can open the second through hole 14A2 in a case where a fastening condition of the shaft screw 62B is adjusted.

As illustrated in FIG. 18, the left wall 14B of the housing 14 includes a third through hole 14B1 and a fourth through hole 14B2.

The third through hole 14B1 faces the rear fixing hole portion H311 of the left attachment portion 30b in the left-right direction. The fastening screw 63A (see FIG. 16) is screwed into the rear fixing hole portion H311 of the left attachment portion 30b. Thus, the third through hole 14B1 faces the fastening screw 63A. For this reason, for example, a user can simply adjust a fastening condition of the left slide rail 40b by the fastening screw 63A through the third through hole 14B 1 by using a tool without removing the housing 14.

The housing 14 may include a third cover member that closes the third through hole 14B 1. The third cover member can open the third through hole 14B 1 in a case where a fastening condition of the fastening screw 63A is adjusted.

The fourth through hole 14B2 faces the front fixing hole portion H312 of the left attachment portion 30b in the left-right direction. The shaft screw 63B (see FIG. 16) is screwed into the front fixing hole portion H312 of the left attachment portion 30b. Thus, the fourth through hole 14B2 faces the shaft screw 63B. For this reason, for example, a user can simply adjust a fastening condition of the left slide rail 40b by the shaft screw 63B through the fourth through hole 14B2 by using a tool without removing the housing 14.

The housing 14 may include a fourth cover member that closes the fourth through hole 14B2. The fourth cover member can open the fourth through hole 14B2 in a case where a fastening condition of the shaft screw 63B is adjusted.

As illustrated in FIG. 19, the bottom wall 14D of the housing 14 includes a fifth through hole 14D1 and a sixth through hole 14D2.

The rear fixing hole portion of the engagement portion 134 described with reference to FIG. 5, FIG. 10, and FIG. 11 moves in a pull-out direction of the pull-out body 130 together with the support member 20. The fifth through hole 14D1 faces the rear fixing hole portion of the engagement portion 134 in the up-down direction in a case where the pull-out body 130 is in a closed state. The fastening screw 61A (see FIG. 5) is screwed into the rear fixing hole portion of the engagement portion 134. Thus, the fifth through hole 14D1 faces the fastening screw 61A. For this reason, for example, a user can simply adjust a fastening condition of the support member 20 by the fastening screw 61A through the fifth through hole 14D1 by using a tool without removing the housing 14.

The housing 14 may include a fifth cover member that closes the fifth through hole 14D1. The fifth cover member can open the fifth through hole 14D1 in a case where a fastening condition of the fastening screw 61A is adjusted.

The sixth through hole 14D2 faces the front fixing hole portion of the engagement portion 134 in the up-down direction in a case where the pull-out body 130 is in a closed state. The shaft screw 61B (see FIG. 5) is screwed into the front fixing hole portion of the engagement portion 134. Thus, the sixth through hole 14D2 faces the shaft screw 61B. For this reason, for example, a user can simply adjust a fastening condition of the support member 20 by the shaft screw 61B through the sixth through hole 14D2 by using a tool without removing the housing 14.

The housing 14 may include a sixth cover member that closes the sixth through hole 14D2. The sixth cover member can open the sixth through hole 14D2 in a case where a fastening condition of the shaft screw 61B is adjusted.

Figure 20:
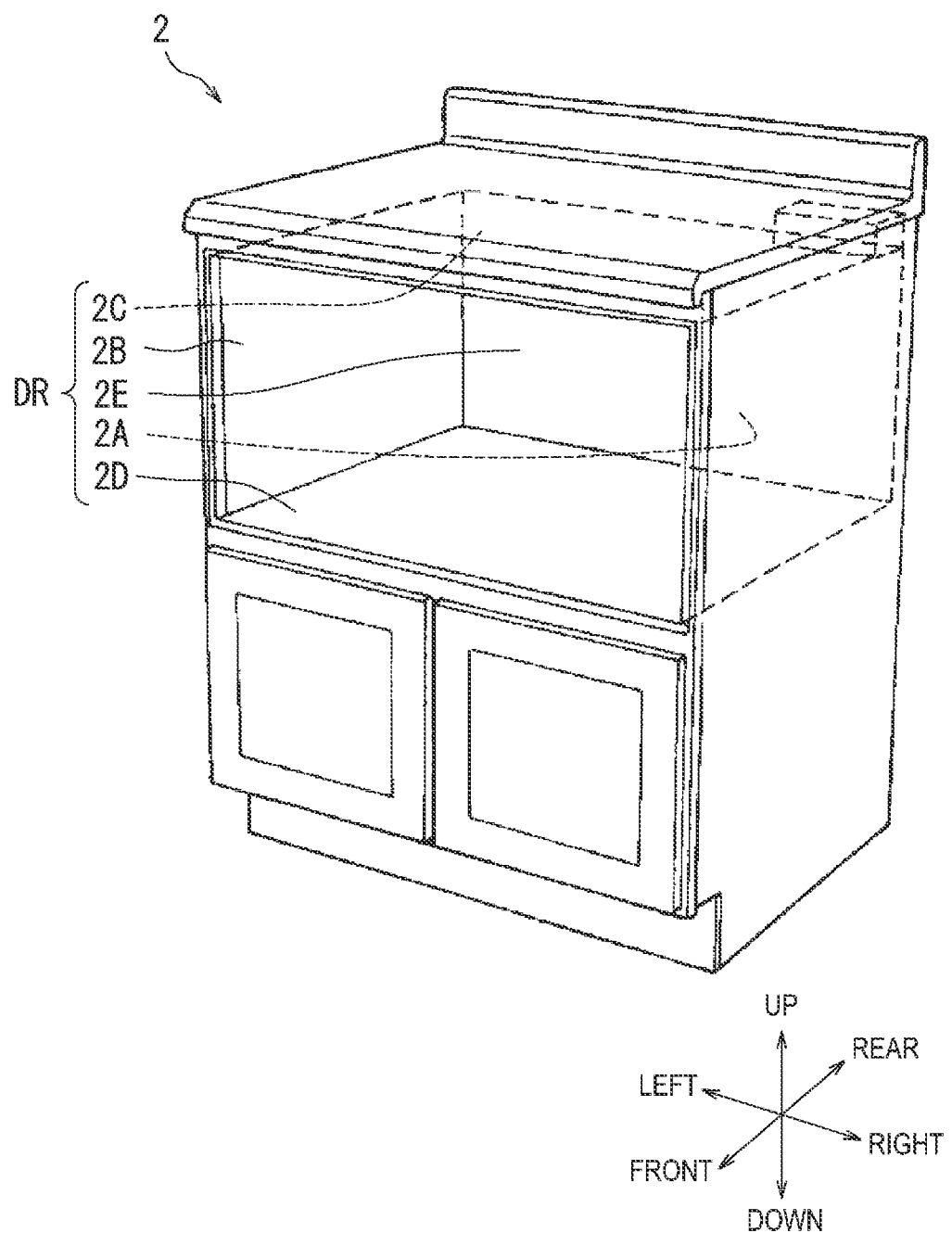
FIG. 20 is a diagram illustrating an appearance of a cabinet in which the heating cooking apparatus according to the embodiment of the present invention is built.

Next, a cabinet 2 in which the heating cooking apparatus 1 is built will be described with reference to FIG. 20. FIG. 20 is a diagram illustrating an external appearance of the cabinet 2 in which the heating cooking apparatus 1 according to the present embodiment is built.

The heating cooking apparatus 1 is disposed in the form of being built into the cabinet 2. As illustrated in FIG. 20, the cabinet 2 includes an accommodation space DR. The heating cooking apparatus 1 is disposed in the accommodation space DR. The accommodation space DR is a space having a rectangular parallelepiped shape. The cabinet 2 includes a right inner surface 2A, a left inner surface 2B, an upper inner surface 2C, a lower inner surface 2D, and a rear inner surface 2E. The accommodation space DR is formed by the right inner surface 2A, the left inner surface 2B, the upper inner surface 2C, the lower inner surface 2D, and the rear inner surface 2E.

As described with reference to FIG. 1 to FIG. 20, the heating cooking apparatus 1 includes the heating cooking chamber 10, the housing 14, the microwave supply unit 53, and the pull-out body unit 13. The pull-out body unit 13 includes the pull-out body 130, the support member 20, and the pair of left and right slide rails 40. The housing 14 includes the first through hole 14A1, the third through hole 14B1, and the fifth through hole 14D1. In order to prevent leakage of electric waves, it is desirable that the sealing angle is set to substantially 0 degrees. In the present embodiment, a user can access the fastening screw 61A, the fastening screw 62A, and the fastening screw 63A through the first through hole 14A1, the third through hole 14B1, and the fifth through hole 14D1 of the housing 14 without removing the housing 14. Thus, the user can adjust the arrangement of the pair of slide rails 40 and the support member 20 by using the first through hole 14A1, the third through hole 14B1, and the fifth through hole 14D1 of the housing 14. Thereby, the user can adjust the arrangement of the pull-out body 130 to set the sealing angle to substantially 0 degrees. As a result, the productivity of the heating cooking apparatus 1 is improved.

As described with reference to FIG. 1 to FIG. 20, the support member 20 includes the pivotally support hole portion H20B and the left-right regulating hole portion H20A. Thus, when the shaft screw 61B is inserted in the pivotally support hole portion H20B, the support member 20 can pivot along the left-right regulating hole portion H20A with the shaft screw 61B as a center. Thus, the user can pivot the support member 20 relative to the heating cooking chamber 10 to set a sealing angle to substantially 0 degrees.

As described with reference to FIG. 1 to FIG. 20, each of the pair of left and right slide rails 40 includes the pivotally support hole portion H43 and the up-down regulating hole portion H42. Thereby, when the shaft screw 62B is inserted in the pivotally support hole portion H43 of the right slide rail 40a, the right slide rail 40a can pivot along the up-down regulating hole portion H42 of the right slide rail 40a with the shaft screw 62B as a center. In addition, when the shaft screw 63B is inserted in the pivotally support hole portion H43 of the left slide rail 40b, the left slide rail 40b can pivot along the up-down regulating hole portion H42 of the left slide rail 40b with the shaft screw 63B as a center. Thus, the user can pivot the pair of left and right slide rails 40 relative to the heating cooking chamber 10 to set the sealing angle to substantially 0 degrees.

As described with reference to FIG. 1 to FIG. 20, each of the pair of left and right slide rails 40 includes the up-down regulating hole portion H42. When the shaft screw 62B is inserted in the pivotally support hole portion H43 of the right slide rail 40a, the right slide rail 40a can pivot in the substantially up-down direction with the shaft screw 62B as a center. When the shaft screw 63B is inserted in the pivotally support hole portion H43 of the left slide rail 40b, the left slide rail 40b can pivot in the substantially up-down direction with the shaft screw 63B as a center. Thus, the user can adjust the arrangement of the pull-out body 130 in the up-down direction.

As described with reference to FIG. 1 to FIG. 20, the pull-out body 130 includes the pair of left and right slide members 133. The heating cooking chamber 10 includes the pair of left and right attachment portions 30. Each of the right attachment portion 30a and the left attachment portion 30b includes the rear fixing hole portion H311. The fastening screw 62A is fixed to the rear fixing hole portion H311 of the right attachment portion 30a through the up-down regulating hole portion H42. The fastening screw 62A is fixed to the rear fixing hole portion H311 of the right attachment portion 30a to fasten the right slide rail 40a. The first through hole 14A1 faces the rear fixing hole portion H311 of the right attachment portion 30a. Thereby, when the user loosens the fastening screw 62A through the first through hole 14A1 and then sets the pull-out body 130 to be in a closed state, the right slide rail 40a pivots in the up-down direction relative to the right attachment portion 30a. As a result, the sealing angle approaches 0 degrees.

The fastening screw 63A is fixed to the rear fixing hole portion H311 of the left attachment portion 30b through the up-down regulating hole portion H42. The fastening screw 63A is fixed to the rear fixing hole portion H311 of the left attachment portion 30b to fasten the left slide rail 40b. The third through hole 14B 1 faces the rear fixing hole portion H311 of the left attachment portion 30b. Thereby, when the user loosens the fastening screw 63A through the third through hole 14B1 and then sets the pull-out body 130 to be in a closed state, the left slide rail 40b pivots in the up-down direction relative to the left attachment portion 30b. As a result, the sealing angle approaches 0 degrees.

As described with reference to FIG. 1 to FIG. 20, the support member 20 includes the left-right regulating hole portion H20A. Thereby, when the shaft screw 61B is inserted in the pivotally support hole portion H20B, the support member 20 can pivot in the substantially left-right direction with the shaft screw 61B as a center. Thus, the user can adjust the arrangement of the pull-out body 130 in the left-right direction.

As described with reference to FIG. 1 to FIG. 20, the heating cooking chamber 10 includes the guide rail portion 101 (see FIG. 10). The pull-out body 130 includes the lid portion 131 and the engagement portion 134. The engagement portion 134 includes a rear fixing portion. The fastening screw 61A is fixed to the rear fixing portion of the engagement portion 134 through the left-right regulating hole portion H20A. The fastening screw 61A is fixed to the rear fixing portion of the engagement portion 134 to fasten the support member 20. The fifth through hole 14D1 faces the rear fixing portion of the engagement portion 134 in a state where the front surface 11D of the heating cooking chamber 10 and the rear surface 131A of the pull-out body 130 abut against each other. Thereby, when the user loosens the fastening screw 61A through the fifth through hole 14D1 and then sets the pull-out body 130 to be in a closed state, the support member 20 pivots in the left-right direction relative to the engagement portion 134. As a result, the sealing angle approaches substantially 0 degrees.

As described with reference to FIG. 1 to FIG. 20, the heating cooking apparatus 1 includes the first air sending unit 51 and the second air sending unit 52. Thereby, the heating cooking apparatus 1 can heat and cook an object to be heated by using hot air having different heating conditions.

In the above, the embodiments of the present invention have been described with reference to the drawings (FIG. 1 to FIG. 20). Note that the present invention is not limited to the embodiment described above and can be implemented in various modes within the scope not departing from the gist of the present invention (for example, (1) to (8) described below). The drawings primarily schematically illustrate each of the constituent elements for the sake of easier understanding, and the thickness, length, quantity, and the like of each of the illustrated constituent elements are different from the actual thickness, length, quantity, and the like by reason of creation of the drawings. Further, the material, shape, dimensions, and the like of each of the constituent elements illustrated in the embodiment described above are merely examples and are not particularly limited, and various modifications can be made within the scope not substantially departing from the effects of the present invention.

(1) As described with reference to FIG. 1 to FIG. 20, in the present embodiment, the housing 14 includes the second through hole 14A2, the fourth through hole 14B2, and the sixth through hole 14D2, but the present invention is not limited thereto. The housing in the present invention may not include the second through hole 14A2, the fourth through hole 14B2, and the sixth through hole 14D2.

(2) As described with reference to FIG. 1 to FIG. 20, in the present embodiment, the pivotally support hole portion H20B of the support member 20 and the pivotally support hole portion H43 of the pair of slide rails 40 are provided as pivotally support portions, and the left-right regulating hole portion H20A of the support member 20 and the up-down regulating hole portion H42 of the pair of slide rails 40 are provided as regulating portions, but the present invention is not limited thereto. The angle adjustment member in the present invention may not include a pivotally support portion and a regulating portion as long as the angle adjustment member is configured to be able to pivot the pull-out body unit 13 relative to the heating cooking chamber 10. For example, the angle adjustment member in the present invention may include a hinge that is connected to the outer surface of the heating cooking chamber 10.

(3) As described with reference to FIG. 1 to FIG. 20, in the present embodiment, each of the left-right regulating hole portion H20A of the support member 20 and the up-down regulating hole portions H42 of the pair of slide rails 40 has a shape of a through hole, but the present invention is not limited thereto. For example, each of the regulating portions in the present invention may have a shape of plurality of recessed portions or the like that can engage with the outer surface of the heating cooking chamber 10.

(4) As described with reference to FIG. 1 to FIG. 20, in the present embodiment, the pivotally support hole portion H20B of the support member 20 faces the front fixing hole of the engagement portion 134, and the left-right regulating hole portion H20A of the support member 20 faces the rear fixing hole of the engagement portion 134, but the present invention is not limited thereto. For example, the pivotally support hole portion H20B of the support member 20 may face the rear fixing hole of the engagement portion 134, and the left-right regulating hole portion H20A of the support member 20 may face the front fixing hole of the engagement portion 134.

(5) As described with reference to FIG. 1 to FIG. 20, in the present embodiment, the up-down regulating hole portion H42 of the right slide rail 40a faces the rear fixing hole portion H311 of the right attachment portion 30a, and the pivotally support hole portion H43 of the right slide rail 40a faces the front fixing hole portion H312 of the right attachment portion 30a, but the present invention is not limited thereto. For example, the up-down regulating hole portion H42 of the right slide rail 40a may face the front fixing hole portion H312 of the right attachment portion 30a, and the pivotally support hole portion H43 of the right slide rail 40a may face the rear fixing hole portion H311 of the right attachment portion 30a.

(6) As described with reference to FIG. 1 to FIG. 20, in the present embodiment, the up-down regulating hole portion H42 of the left slide rail 40b faces the rear fixing hole portion H311 of the left attachment portion 30b, and the pivotally support hole portion H43 of the left slide rail 40b faces the front fixing hole portion H312 of the left attachment portion 30b, but the present invention is not limited thereto. For example, the up-down regulating hole portion H42 of the left slide rail 40b may face the front fixing hole portion H312 of the left attachment portion 30b, and the pivotally support hole portion H43 of the left slide rail 40b may face the rear fixing hole portion H311 of the left attachment portion 30b.

(7) As described with reference to FIG. 1 to FIG. 20, in the present embodiment, the heating cooking chamber 10 includes the pair of left and right attachment portions 30, but the present invention is not limited thereto. The heating cooking apparatus 1 may not include the pair of left and right attachment portions 30. In a case where the heating cooking apparatus 1 does not include the pair of left and right attachment portions 30, the pair of left and right slide rails 40 may be directly attached to the outer surface of the heating cooking chamber 10.

(8) As described with reference to FIG. 1 to FIG. 20, in the present embodiment, the heating cooking apparatus 1 includes the first air sending unit 51, the second air sending unit 52, and the grill unit 54, but the present invention is not limited thereto. For example, the heating cooking apparatus of the present invention may not include the first air sending unit 51, the second air sending unit 52, and the grill unit 54. In addition, the heating cooking apparatus of the present invention may include one or two of the first air sending unit 51, the second air sending unit 52, and the grill unit 54.

INDUSTRIAL APPLICABILITY

The present invention is useful in the field of a heating cooking apparatus, for example.

REFERENCE SIGNS LIST

1 Heating cooking apparatus
1A Accommodation space
10 Heating cooking chamber
11A First opening
11D Front surface
13 Pull-out body unit
130 Pull-out body
131A Rear surface
14 Housing
14A1 First through hole
30 Attachment portion
40 Pair of left and right slide rails
53 Microwave supply unit

The invention claimed is:

1. A heating cooking apparatus comprising:
a heating cooking chamber including:
an accommodation space configured to accommodate an object to be heated,
an opening communicating with the accommodation space, and
a first surface disposed on an outer circumference of the opening;
a housing configured to accommodate the heating cooking chamber;
a microwave supply unit configured to supply microwaves to an interior of the heating cooking chamber; and
a pull-out body unit, wherein the pull-out body unit includes:
a pull-out body including a second surface that faces the first surface and that is configured to be pulled out freely relative to the heating cooking chamber, and
an angle adjustment member configured to adjust an angle of the second surface relative to the first surface, and
the housing includes a through hole that faces the angle adjustment member.

2. The heating cooking apparatus according to claim 1, wherein the angle adjustment member includes;
a pivotal support portion with which the angle adjustment member is pivotally supported in the heating cooking chamber, and
a regulating portion configured to regulate a pivot direction of the angle adjustment member.

3. The heating cooking apparatus according to claim 2, wherein the regulating portion includes an up-down regulating portion configured to regulate the pivot direction of the angle adjustment member in an up-down direction.

4. The heating cooking apparatus according to claim 3, wherein the pull-out body includes a slide member extending in a pull-out direction of the pull-out body,
the angle adjustment member further includes a slide rail engaging with the slide member and slidably supporting the pull-out body in the pull-out direction,
the heating cooking chamber further includes an attachment portion to which a first shaft member is fixed, the first shaft member being pivotally supported by the pivotal support portion of the angle adjustment member,
the attachment portion includes a first fixing portion to which a first fastening member is fixed,
the first fastening member is fixed to the first fixing portion through the up-down regulating portion of the angle adjustment member,
the first fastening member is fixed to the first fixing portion to fasten the slide rail, and
the through hole includes a first through hole facing the first fixing portion.

5. The heating cooking apparatus according to claim 2, wherein the regulating portion includes a left-right regulating portion configured to regulate the pivot direction of the angle adjustment member in a left-right direction.

6. The heating cooking apparatus according to claim 5, wherein the heating cooking chamber further includes a guide rail portion extending in a pull-out direction of the pull-out body,
the pull-out body includes:
a lid portion including the second surface, and
an engagement portion engaging with the guide rail portion,
the angle adjustment member includes a support member pivotally attached to the engagement portion and supporting the lid portion,
the engagement portion includes a second shaft member fixed to the engagement portion, the second shaft member being pivotally supported by the pivotal support portion of the angle adjustment member,
the engagement portion includes a second fixing portion to which a second fastening member is fixed,
the second fastening member is fixed to the second fixing portion through the left-right regulating portion of the angle adjustment member,
the second fastening member is fixed to the second fixing portion to fasten the support member, and
the through hole includes a second through hole facing the second fixing portion when the first surface abuts the second surface.

7. The heating cooking apparatus according to claim 1, further comprising at least one air sending unit configured to supply hot air to the interior of the heating cooking chamber.

8. The heating cooking apparatus according to claim 7, wherein the at least one air sending unit includes a first air sending unit and a second air sending unit.

\* \* \* \* \*